US012671883B1

(12) United States Patent
Hsieh

(10) Patent No.: US 12,671,883 B1
(45) Date of Patent: Jun. 30, 2026

(54) THERMAL IMAGING SYSTEM ADAPTED TO GENERATE EDGE-ENHANCED IMAGE

(71) Applicant: Chi-Sheng Hsieh, Zhubei City (TW)

(72) Inventor: Chi-Sheng Hsieh, Zhubei City (TW)

( * ) Notice: Subject to any disclaimer, the term of this patent is extended or adjusted under 35 U.S.C. 154(b) by 0 days.

(21) Appl. No.: 19/193,805

(22) Filed: Apr. 29, 2025

(51) Int. Cl.
| | |
|---|---|
| *H04N 7/18* | (2006.01) |
| *H04N 23/11* | (2023.01) |
| *H04N 23/13* | (2023.01) |
| *H04N 23/51* | (2023.01) |
| *H04N 23/55* | (2023.01) |

(52) U.S. Cl.
CPC ............. *H04N 23/11* (2023.01); *H04N 23/13* (2023.01); *H04N 23/51* (2023.01); *H04N 23/55* (2023.01)

(58) Field of Classification Search
CPC ........ H04N 23/11; H04N 23/13; H04N 23/51; H04N 23/55
See application file for complete search history.

(56) References Cited

U.S. PATENT DOCUMENTS

| | | | | |
|---|---|---|---|---|
| 5,673,143 A | * | 9/1997 | Chin ...................... | G02B 23/12 |
| | | | | 359/422 |
| 5,719,567 A | * | 2/1998 | Norris ....................... | G01S 7/48 |
| | | | | 398/115 |
| 6,570,608 B1 | * | 5/2003 | Tserng ................... | G06V 40/20 |
| | | | | 348/700 |
| 7,538,326 B2 | * | 5/2009 | Johnson .................. | G01C 3/08 |
| | | | | 250/370.08 |
| 10,848,691 B2 | | 11/2020 | Hsieh et al. | |

| | | | | |
|---|---|---|---|---|
| 11,420,570 B2 | * | 8/2022 | Shaharabani | .......... G06V 20/56 |
| 2012/0007979 A1 | * | 1/2012 | Schneider | ................. G01J 3/36 |
| | | | | 348/116 |
| 2014/0253735 A1 | * | 9/2014 | Fox | ........................ H04N 25/76 |
| | | | | 348/164 |

(Continued)

FOREIGN PATENT DOCUMENTS

| | | |
|---|---|---|
| TW | 201239502 A | 10/2012 |
| WO | 2019/153787 A1 | 8/2019 |

OTHER PUBLICATIONS

Search Report appended to an Office Action, which was issued to Taiwanese counterpart application No. 112148044 by the TIPO on Aug. 15, 2024, with an English translation thereof (2 pages).

(Continued)

*Primary Examiner* — Gims S Philippe
(74) *Attorney, Agent, or Firm* — HSML P.C.

(57) ABSTRACT

A thermal imaging system adapted to generate an edge-enhanced image is provided to include a first camera module, a second camera module, an array-type near-infrared light source, and a processor. The first camera module receives both of visible light and near-infrared from a target scene, and generates a dual-spectral image based on the visible light and the near-infrared. The second camera module receives far-infrared from the target scene, and generates a far-infrared image based on the far-infrared. The array-type near-infrared light source is disposed to emit near-infrared toward the target scene at different angles simultaneously. The processor generates the edge-enhanced image by overlaying the dual-spectral image on the FIR image using alpha blending, or by extracting dual-spectral edges the dual-spectral image, and overlaying the dual-spectral edges on the FIR image.

8 Claims, 39 Drawing Sheets
(10 of 39 Drawing Sheet(s) Filed in Color)

(56)     References Cited

U.S. PATENT DOCUMENTS

| | | | |
|---|---|---|---|
| 2014/0340515 A1 | 11/2014 | Tanaka et al. | |
| 2016/0026880 A1* | 1/2016 | Lee .......................... | G06T 7/70 |
| | | | 382/103 |
| 2019/0020831 A1 | 1/2019 | Hsieh et al. | |
| 2021/0373164 A1* | 12/2021 | Thun-Hohenstein ........................ | |
| | | | G01S 7/4863 |
| 2022/0124262 A1* | 4/2022 | Gallucci ................. | G06T 7/246 |

OTHER PUBLICATIONS

Search Report appended to an Office Action, which was issued to Taiwanese counterpart application No. 112148044 by the TIPO on Oct. 17, 2024, with an English translation thereof (2 pages).

* cited by examiner pure thermal image + VIS edges pure thermal image

α=0%

α=20%

α=40%

α=100%

72B

71B

72A

71A

71A 72A
72B
71B

73

72

71

THERMAL IMAGING SYSTEM ADAPTED TO GENERATE EDGE-ENHANCED IMAGE

FIELD

The disclosure relates to thermal imaging, and more particularly to a thermal imaging system adapted to generate a thermal image with enhanced dual-spectral edges.

BACKGROUND

Visible light cameras are typically used for daytime applications or in well-lit environments to capture color or monochrome images in the visible spectrum (hereafter referred to as visible light, VIS). However, in conditions with smoke, fog, or other adverse environmental factors, the visible light cameras may fail to form clear images or produce blurry results.

Thermal imaging cameras (also known as far-infrared cameras), on the other hand, detect far-infrared radiation (such as heat) emitted from a surface of an object to generate thermal images (hereafter referred to as pure thermal images), regardless of the presence of visible light.

Conventional thermal imaging cameras (e.g., FLIR ONE® Edge Pro) include both a thermal lens and a visible light lens. The thermal lens allows passage of infrared radiation in a far-infrared (FIR) range from about 8 μm to about 14 μm, for a thermal image sensor (e.g., a focal plane array, FPA) to capture a thermal energy distribution map of a target scene. The visible light lens allows passage of light in a visible light spectrum ranging from about 0.4 μm to about 0.7 μm, for a standard image sensor to generate a visible light image based on the visible light from the target scene.

The standard image sensor typically captures electromagnetic waves in a wavelength range from about 400 nm to about 1000 nm, where a wavelength range from 400 nm to 780 nm (or approximately from 400 nm to 700 nm) corresponds to the visible light spectrum, and a wavelength range from 780 nm to 1000 nm (or approximately from 700 nm to 1000 nm) corresponds to a near-infrared (NIR) spectrum, which is not visible by the human eyes.

To prevent color distortion (e.g., images having a reddish tone) caused by NIR interference, an infrared cutoff filter (ICF) is usually placed between the visible light lens and the standard image sensor, ensuring that only pure visible light is captured by the standard image sensor.

Some conventional thermal imaging cameras employ a multi-spectral dynamic imaging techniques (e.g., MSX®, developed by Teledyne FLIR LLC) to capture VIS edges (or contour lines) in the target scene from the VIS image and combine the VIS edges obtained from the VIS image with the pure thermal image, thereby creating a blended thermal image that has clearer details (compared to the pure thermal image that is unable to show some details in the target scene when those details do not have a temperature gradient, such as printed patterns, facial details, etc.).

FIG. 1 illustrates a conventional thermal imaging camera 1 including a housing 10, a first camera module 11, a second camera module 12, a processor 13, and an infrared cutoff filter 14. The first camera module 11 includes a first image sensor 111 accommodated in the housing 10, and a first lens 112 attached to a front surface of the housing 10 and corresponding in position to the first image sensor 111. The first image sensor 111 is a standard image sensor and is sensitive to near-infrared and visible light. The second camera module 12 includes a second image sensor 121 accommodated in the housing 10, and a second lens 122 attached to the front surface of the housing 10 and corresponding in position to the second image sensor 121. The second image sensor 121 is sensitive to far-infrared for obtaining an FIR image (i.e., the pure thermal image) of the target scene, where the FIR image results from a temperature distribution in the target scene. The infrared cutoff filter 14 is disposed between the first image sensor 111 and the first lens 112, thereby filtering out near-infrared, so only the visible light arrives at the first image sensor 111, and a VIS image is generated through a digitizing circuit accordingly. By virtue of the infrared cutoff filter 14, the VIS image is not affected by the near-infrared and does not appear reddish.

FIG. 2 illustrates a normalized intensity of light received by the first image sensor 111 of the conventional thermal imaging camera 1 as a function of wavelength of light. The processor 13 is coupled to the first image sensor 111 and the second image sensor 121 through the digitizing circuits for receiving the VIS image and the FIR image, and is configured to extract VIS edges of the target scene from the VIS image, and to combine the FIR image and the VIS edges to create a blended thermal image.

FIG. 3 provides two thermal images, where the left one is a pure thermal image, and the right one is a blended thermal image that combines the VIS edges and the FIR image. It is obvious that the blended thermal image includes more details of the target scene. FIG. 4 provides a VIS image and a pure thermal image at the left side and the right side, respectively. The VIS image has clear details of the mug, with the design on the body and the handle being clearly visible, while the pure thermal image lacks clear details, where not only is the design on the body invisible, but the handle is also barely visible.

FIG. 5 includes images P130 to P132 to illustrate an operation of generating a blended thermal image using the aforementioned conventional thermal imaging camera 1 (see FIG. 1). The image P130 is a VIS image captured by the first camera module 11, and displays a ceramic mug on a table, where the mug has a spotted pattern on its outer surface, and was filled with hot water when the image P130 was being captured. The image P131 is obtained by performing edge extraction on a VIS image of the mug, and thus displays VIS edges of the mug and the spotted pattern. It is noted that the use of the images P130 and P131 is only for explaining the operation flow, and does not mean that the image P131 is obtained from the image P130. The image P132 is an FIR image captured by the second camera module 12, where a water level inside the mug is clearly visible because its heat has been conducted to the corresponding area of the body of the mug, while other parts of the mug, such as the handle and the upper portion of the body, are not clearly visible in the image P132 since their temperatures are close to the ambient temperature.

FIG. 6 illustrates another approach to obtain a blended thermal image, which uses alpha blending. In practice, one of the thermal image (e.g., the image P132 in FIG. 5) and the image of VIS edges (e.g., the image P131 in FIG. 5) is set as a foreground image, and the other is set as a background image. Then, the foreground image is multiplied by an alpha value α that ranges between 0 and 1 (i.e., from 0% to 100%), the background image is multiplied by (1−α), and then the processed foreground image is aligned with and overlaid onto the processed background image. The smaller the alpha value, the greater the transparency of the foreground image, allowing the background image to appear more prominently through the foreground image.

However, when the visible light is insufficient (e.g., in a dark environment), the abovementioned technique is unable to obtain the details or edges in the target scene, so the resultant blended thermal image would be similar to the pure thermal image and show blurry contours of objects that result from temperature gradients.

SUMMARY

Therefore, an object of the disclosure is to provide a thermal imaging system that can alleviate at least one of the drawbacks of the prior art.

According to the disclosure, the thermal imaging system is adapted to generate an edge-enhanced image, and includes a first camera module, a second camera module, an array-type near-infrared (NIR) light source, and a processor. The first camera module is configured to receive both of visible light (VIS) and near-infrared from a target scene, and to generate a dual-spectral image that is composed of a VIS image component and an NIR image component based on the visible light and the near-infrared. The second camera module is configured to receive far-infrared from the target scene, and to generate a far-infrared (FIR) image based on the far-infrared. The array-type NIR light source includes a plurality of NIR emitting components disposed to emit near-infrared toward the target scene simultaneously at different angles. The processor is electrically connected to the first camera module and the second camera module, and is configured to generate the edge-enhanced image using one of a first image processing and a second image processing. In the first image processing, the processor overlays the dual-spectral image on the FIR image using alpha blending. In the second image processing, the processor extracts dual-spectral edges of the target scene from the VIS image component and the NIR image component of the dual-spectral image, and overlays the dual-spectral edges on the FIR image, where the dual-spectral edges contain VIS edge components extracted from the VIS image component, and NIR edge components extracted from the NIR image component.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features and advantages of the disclosure will become apparent in the following detailed description of the embodiment(s) with reference to the accompanying drawings. It is noted that various features may not be drawn to scale.

DETAILED DESCRIPTION

Figure 1:
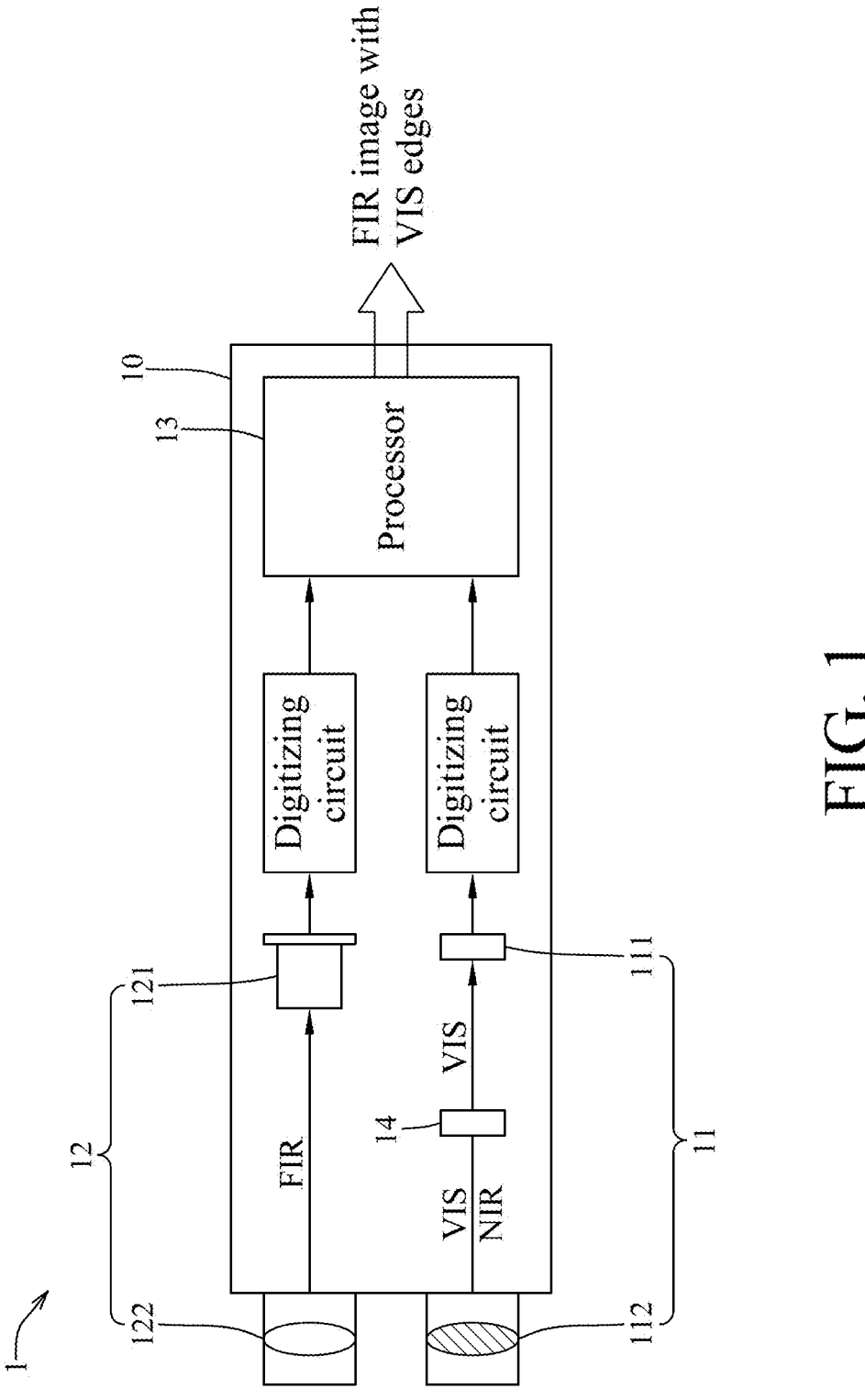
FIG. 1 is a block diagram illustrating a conventional thermal imaging camera.
Figure 2:
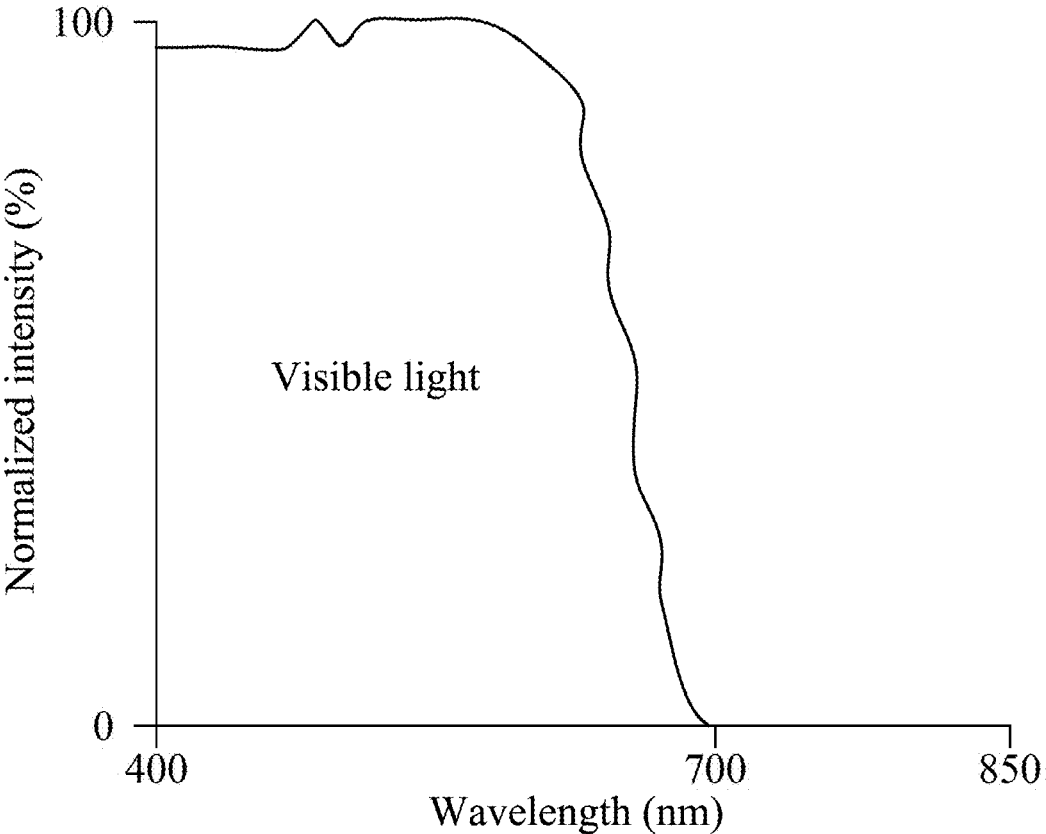
FIG. 2 is a plot illustrating intensity of light received by a first image sensor of the conventional thermal imaging camera as a function of wavelength of light.
Figure 3:
FIG. 3 provides a pure thermal image and a blended thermal image for comparison.
Figure 3:
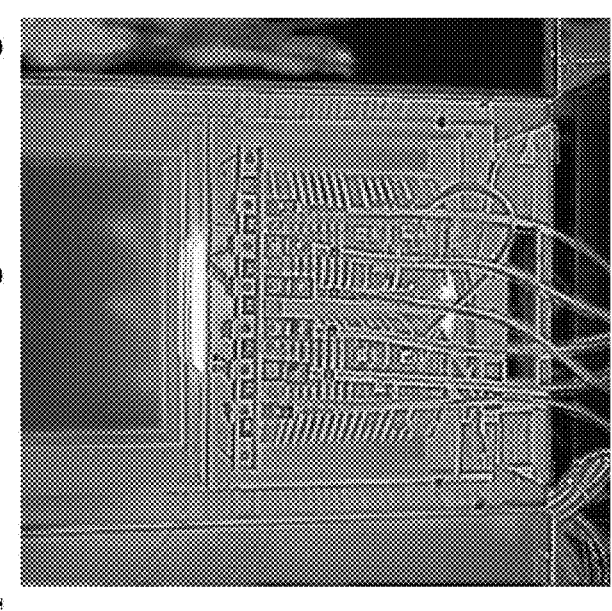
Figure 3:
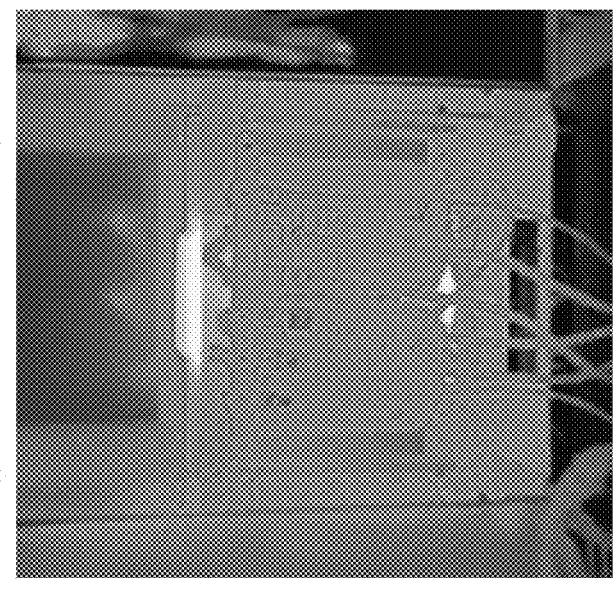
Figure 4:
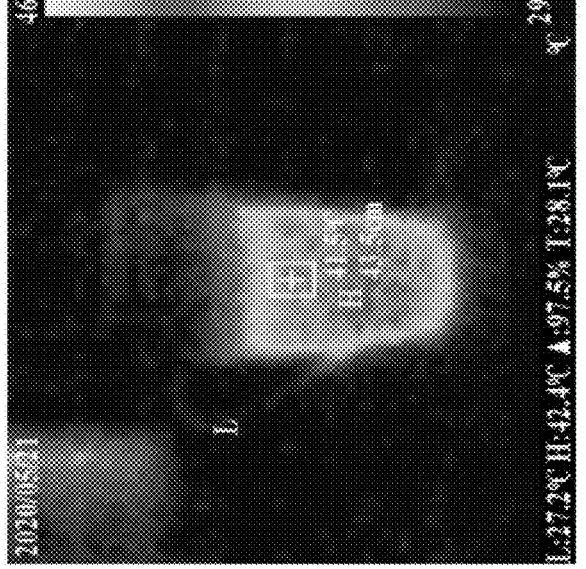
FIG. 4 provides a visible light image and a pure thermal image of a mug filled with hot water.
Figure 4:
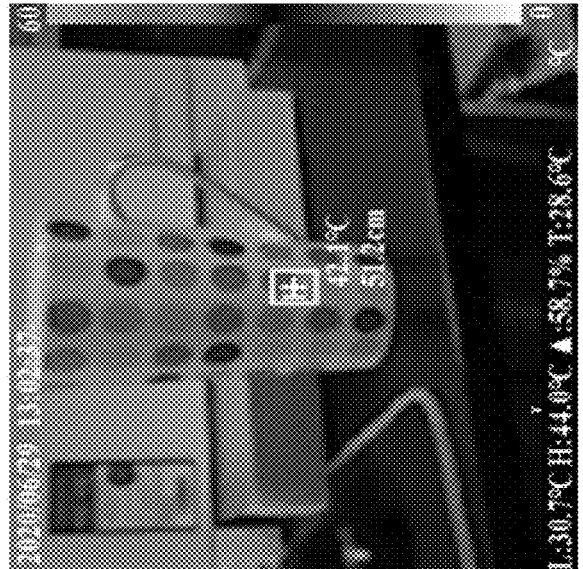
Figure 5:
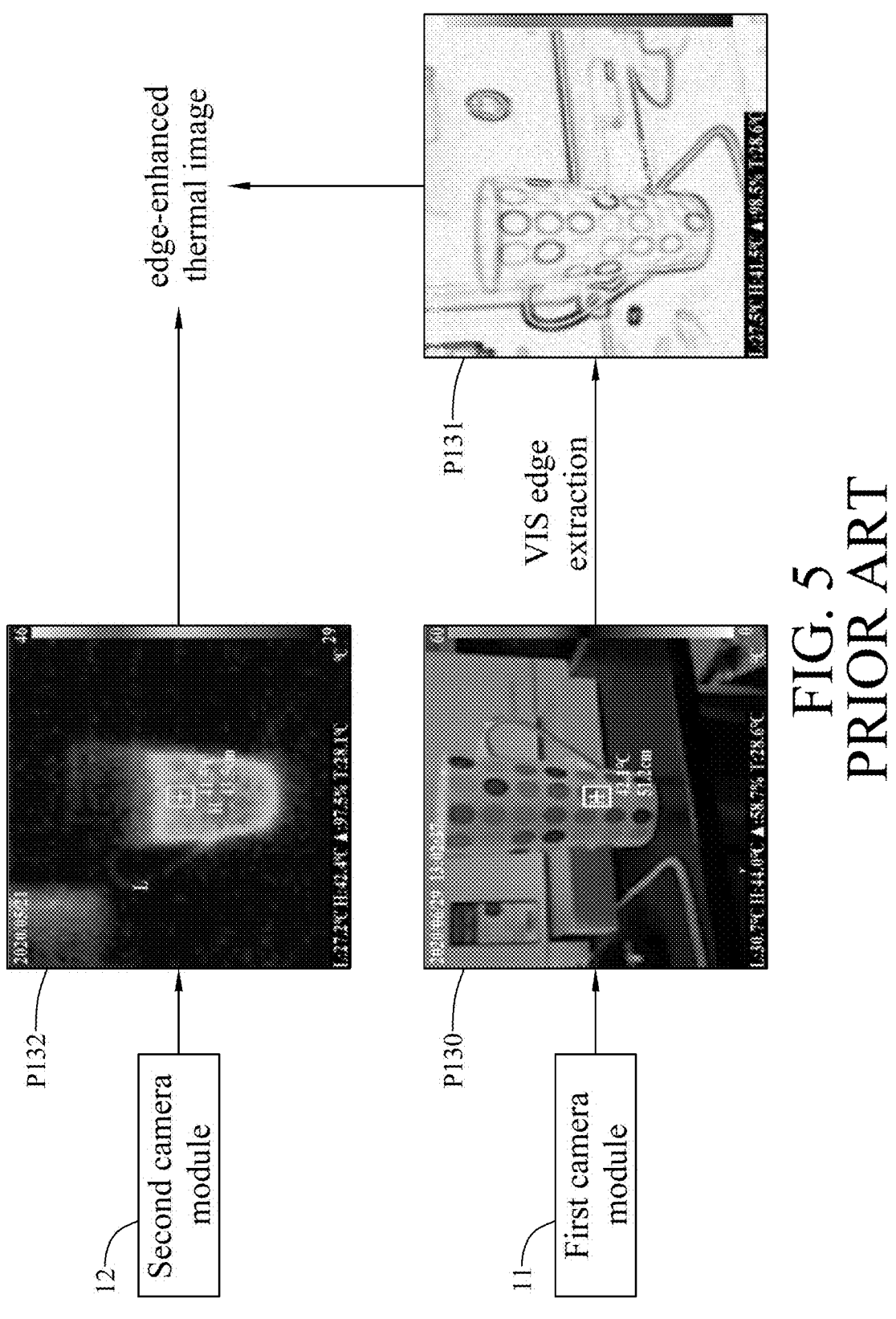
FIG. 5 illustrates an operation flow of generating a blended thermal image.
Figure 6:
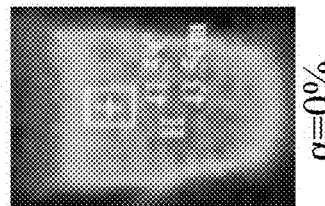
FIG. 6 illustrates several blended thermal images that are generated using alpha blending.
Figure 6:
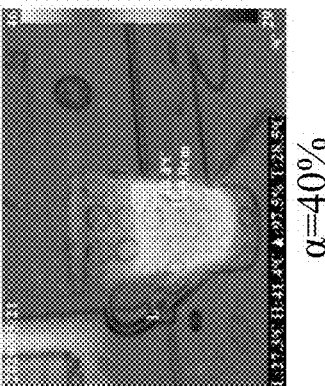
Figure 6:
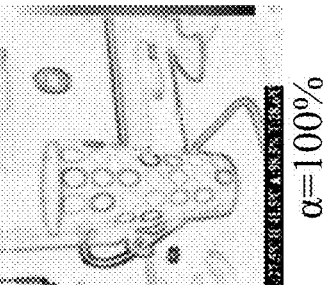

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

It should be noted herein that for clarity of description, the term "image" should not be confused with "edge." The term "image" refers to a picture in its entirety, which is composed of pixels, and can be a photo, a drawing, a scanned image, etc. Image processing involves various operations, such as applying filters, adjusting colors, cropping, scaling, and more.

In the description, when an infrared cutoff filter is placed between a visible light lens and an image sensor, the resulting image that is generated based on only visible light is referred to as a "visible light image" or "VIS image." In a case where no infrared cutoff filter is placed between a visible light lens and an image sensor, since the image sensor is sensitive to both visible light and near-infrared, the resulting image is referred to as a "dual-spectral image" that includes a visible light image component (VIS image component) and a near-infrared image component (NIR image component).

On the other hand, the term "edge" refers to a result of processing an image (e.g., the visible light image or the dual-spectral image) using an "edge extraction" technique. The edge detection technique identifies areas in the image where there is a sudden change in intensity or color, typically representing a boundary of objects or structures. In other words, "edge" is a feature in an image, usually referring to areas where there is a sharp change in brightness or color. Edge detection is an important step in image processing used to identify the contours and shapes of objects. Common edge detection algorithms include, for example, Sobel, Canny, and others. In this description, the contour or contour line identified from a visible light image or the VIS image component of a dual-spectral image is referred to as a "visible light edges" or "VIS edge;" the contour or contour line identified from the NIR image component of a dual-spectral image is referred to as a "near-infrared edge" or "NIR edge."

Briefly, an image is a direct output of a camera module, such as the colored photos or images taken by the camera module. On the other hand, an edge is indirectly obtained from the camera module by processing the image, such as through edge detection or edge extraction, which is commonly used in image processing and computer vision.

Figure 7:
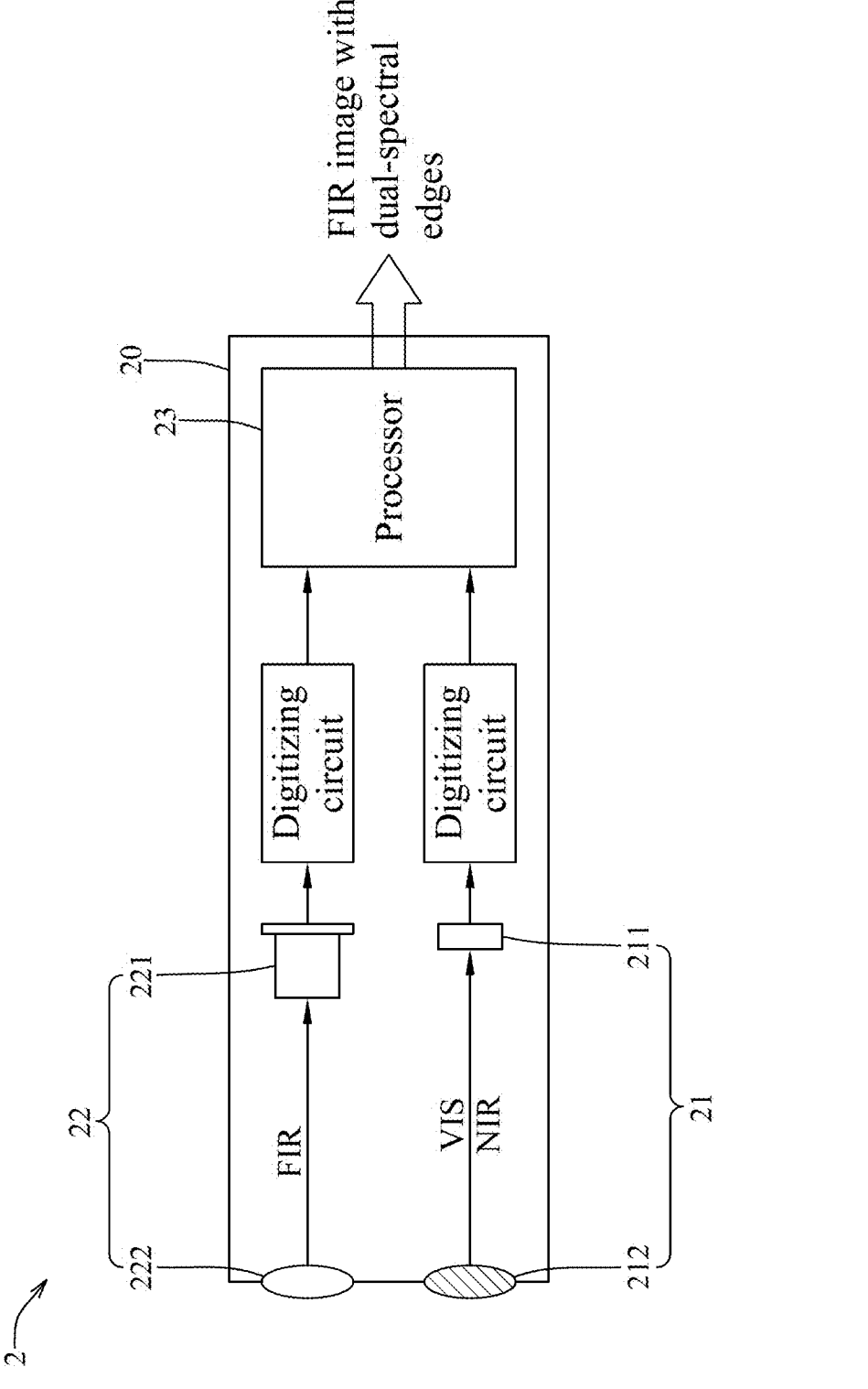
FIG. 7 is a block diagram illustrating an embodiment of a thermal imaging camera according to this disclosure.
Figure 8:
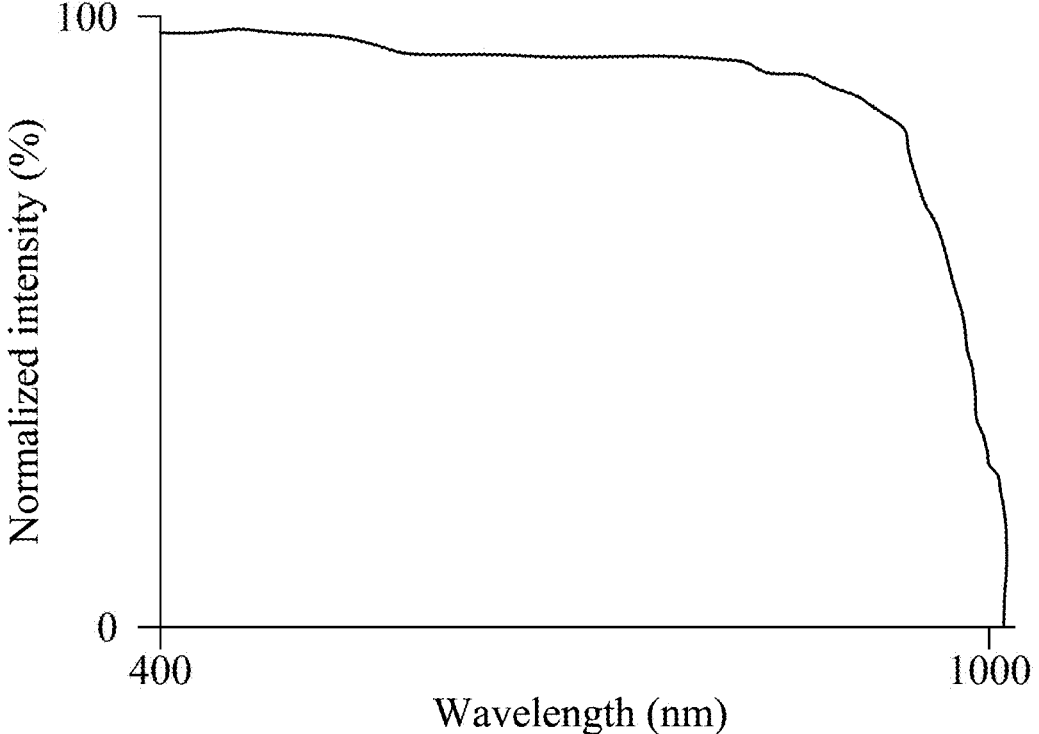
FIG. 8 is a plot illustrating intensity of light received by a first image sensor of the embodiment of the thermal imaging camera as a function of wavelength of light.

FIG. 7 illustrates an embodiment of a thermal imaging camera 2 according to this disclosure. The thermal imaging camera 2 includes a housing 20, a first camera module 21, a second camera module 22 and a processor 23. The first camera module 21 includes a first image sensor 211 accommodated in the housing 20, and a first lens 212 attached to a front surface of the housing 20, exposed from a lens portion of the housing 20, and corresponding in position to the first image sensor 211. The first image sensor 211 is sensitive to near-infrared and visible light. The second camera module 22 includes a second image sensor 221 accommodated in the housing 20, and a second lens 222 attached to the front surface of the housing 20, exposed from the lens portion of the housing 20, and corresponding in position to the second image sensor 221. The second image sensor 221 is sensitive to far-infrared for obtaining an FIR image (i.e., a pure thermal image) of a target scene, where the FIR image results from a temperature distribution in the target scene. The thermal imaging camera 2 does not include an infrared cutoff filter, so both of the visible light and the infrared would arrive at the first image sensor 211 for a digitizing circuit to generate a dual-spectral image that is composed of a VIS image component and an NIR image component. The processor 23 is coupled to the first image sensor 211 and the second image sensor 221 through digitizing circuits for receiving the dual-spectral image and the FIR image, and is configured to extract dual-spectral edges, which are composed of VIS edge components and NIR edge components, of the target scene from the dual-spectral image, and to overlay the dual-spectral edges on the FIR image to create an edge-enhanced thermal image. FIG. 8 illustrates a normalized intensity of light received by the first image sensor 211 of the thermal imaging camera 2 as a function of wavelength of light. In some embodiments, the processor 23 may combine the dual-spectral image and the thermal image using alpha blending to generate the edge-enhanced thermal image, and this disclosure is not limited in this respect.

Figure 9:
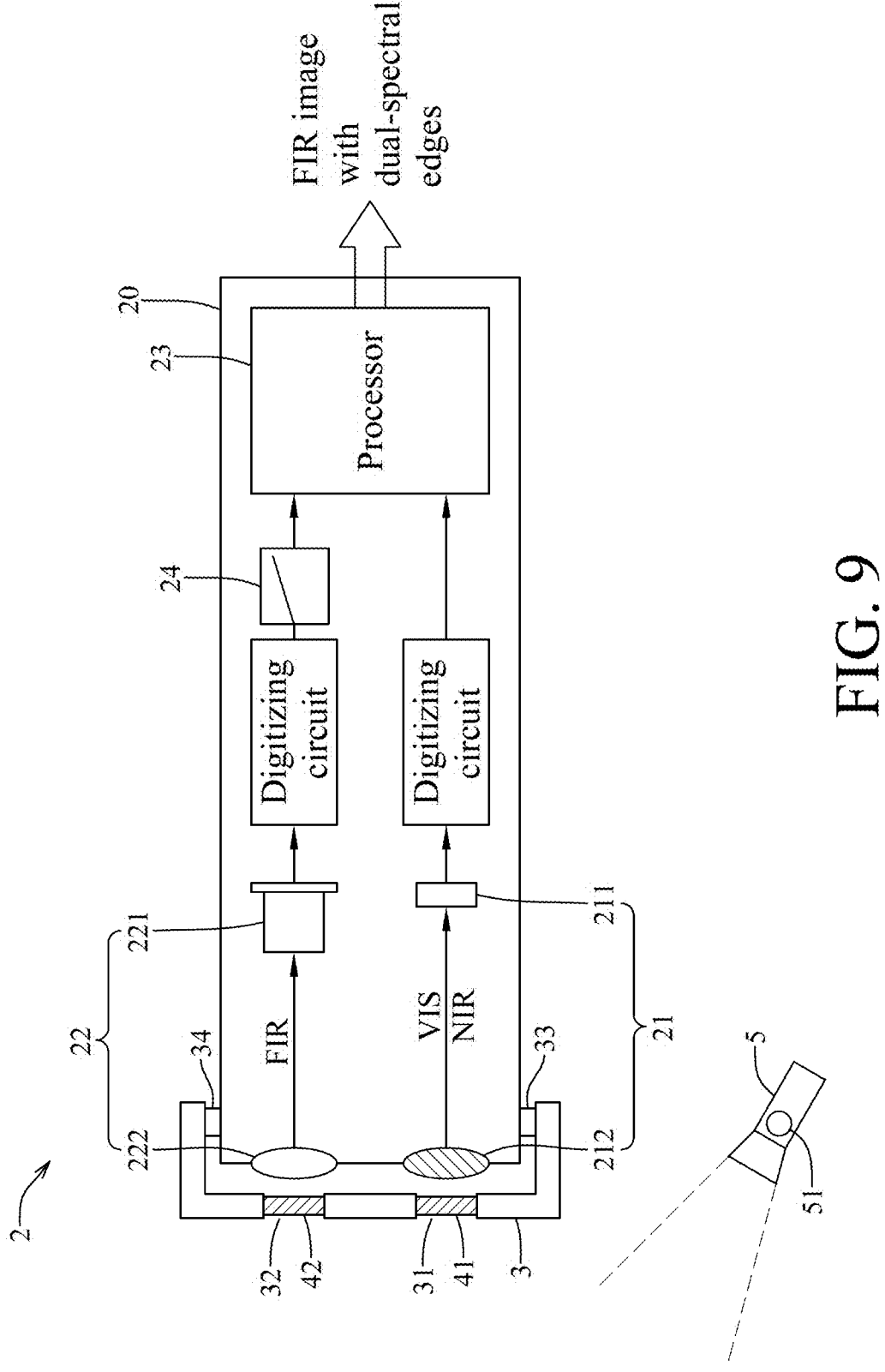
FIG. 9 is a block diagram illustrating an embodiment of a thermal imaging system according to this disclosure.

FIG. 9 illustrates an embodiment of a thermal imaging system according to this disclosure. The thermal imaging system includes the thermal imaging camera 2 as illustrated in FIG. 7, an add-on frame 3, and an NIR light source 5.

The add-on frame 3 is detachably mounted to the lens portion of the housing 20, and has at least one opening for mounting one or more optical elements. In FIG. 9, the add-on frame 3 has a first opening 31 and a second opening 32. The first opening 31 is adapted to mount an optical element 41 therein (e.g., through embedding or adhesive bonding), and the second opening 32 is adapted to mount an optical element 42 therein. The add-on frame 3 is configured in such a way that, when the add-on frame 3 is mounted to the housing 20 properly, the first opening 31 is aligned with the first lens 212 and is disposed between the first lens 212 and the target scene, and the second opening 32 is aligned with the second lens 222 and is disposed between the second lens 222 and the target scene. In some embodiments, the second opening 32 may be omitted, and this disclosure is not limited in this respect. The add-on frame 3 further includes one or more connection mechanisms for attaching to the housing 20. In FIG. 9, the add-on frame 3 includes connection mechanisms 33, 34, each of which may be a magnet for magnetically attaching to the housing 20, or a tenon for interlocking with the housing 20.

Figure 10:
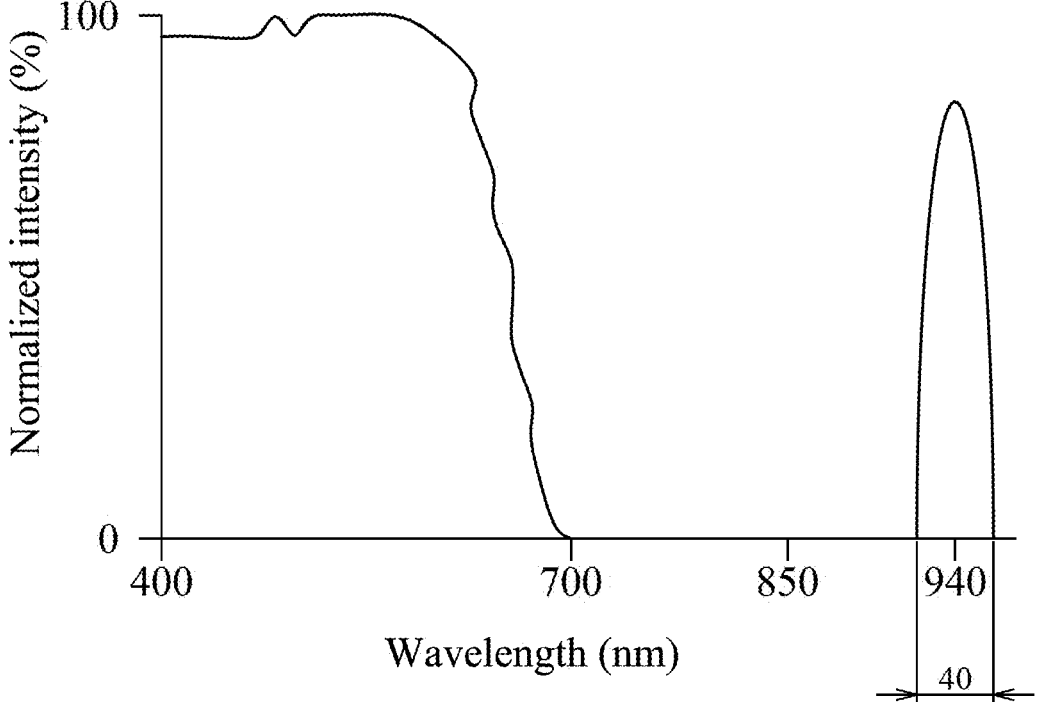
FIG. 10 is a plot illustrating intensity of light received by the first image sensor as a function of wavelength of light when a near-infrared filter is used in an add-on frame of a thermal imaging system in accordance with some embodiments.

In this embodiment, the optical element 41 is an NIR filter that is configured to filter out light with a wavelength falling outside of a spectrum of the visible light and a spectrum of narrowband near-infrared having a bandwidth of, for example, not greater than 40 nm, with a center wavelength of, for example, 850 nm, 880 nm, 940 nm or 960 nm, which is spaced apart from the visible light spectrum. Accordingly, when the add-on frame 3 is attached to the housing 20 and the NIR filter is mounted in the first opening 31 as the optical element 41, only the VIS light and the narrowband infrared pass through the first lens 212, so the first image sensor 211 captures a dual-spectral image that is composed of a VIS image component and a narrowband NIR image component. Since the spectrum of the narrowband near-infrared is spaced apart from the visible light spectrum, the dual-spectral image would not appear reddish. FIG. 10 illustrates a normalized intensity of light received by the first image sensor 211 of the thermal imaging camera 2 as a function of wavelength of light in a case where the add-on frame 3 is attached to the housing 20 and the NIR filter is mounted in the first opening 31, wherein the NIR filter is exemplified to be capable of filtering out light with a wavelength falling outside of a spectrum of the visible light and a spectrum of narrowband near-infrared having a bandwidth of 40 nm, with a center wavelength of 940 nm. Since the optical element 41 is mounted to the add-on frame 3 rather than built in the thermal imaging camera 2 (e.g., being disposed between the first lens 212 and the first image sensor 211), the optical element 41 can be easily removed from or attached to the thermal imaging camera 2 as desired, thereby promoting flexibility and convenience of use. The NIR light source 5 is disposed to emit the narrowband near-infrared toward the target scene, and includes a dimmer 51 that uses, for example, a variable resistor (not shown) to adjust an intensity of the narrowband near-infrared. The NIR light source 5 is either separable from or attached to the thermal imaging camera 2. When the NIR light source 5 is separated from the thermal imaging camera 2, the NIR light source 5 can be placed at a desired location, so a user can project the narrowband near-infrared toward the target scene at a desired angle.

In some embodiments, the optical element 41 mounted in the first opening 31 is replaceable and can be of various types to accommodate different functions as needed. In one embodiment, the optical element 41 is an infrared cutoff filter (ICF), so the first lens 212 and the first image sensor 211 can capture VIS images without a reddish tint. In one embodiment, the optical element 41 is a macro or microscopic lens capable of magnification and close-up photography. In one embodiment, the optical element 41 is a special infrared-corrected lens configured to focus a broad wavelength range (e.g., from about 430 nm to about 900 nm or even longer) onto the same plane.

Figure 11:
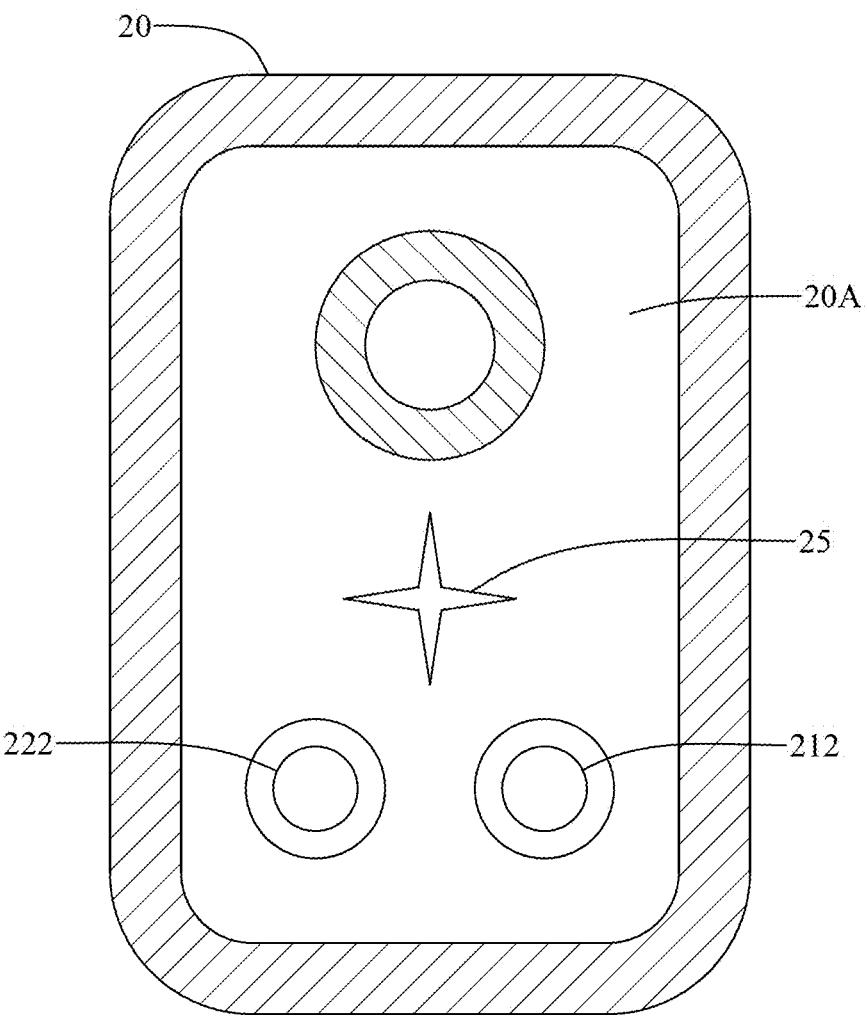
FIG. 11 is a schematic diagram illustrating an exemplary lens portion of a thermal imaging camera in accordance with some embodiments.

FIG. 11 illustrates an exemplary lens portion 20A of housing 20, which is taken from a thermal imager model IRC130, produced by Teledyne FLIR LLC. The lens portion 20A is a portion of the front surface of the housing 20 where the first lens 212 and the second lens 222 are exposed. A visible light source 25 (e.g., emitting white light) is mounted to the lens portion 20A. The following steps describe an approach for modifying the thermal imager model IRC130, the configuration of which is similar to that of the conventional thermal imaging camera 1 shown in FIG. 1, into the thermal imaging camera 2 as illustrated in FIGS. 7 and 9. The first step is to dissemble the lens portion 20A, and carefully remove the infrared cutoff filter 14 located between the first lens 112 and the first image sensor 111 by, for example, gently and slowly scraping it off with a blade. After the removal of the infrared cutoff filter 14, due to the varying refractive indices of glass for different wavelengths of light, the focal point will shift, causing an "out of focus" effect. Therefore, a focal distance of the first lens 112 should be readjusted to prevent degradation in image quality.

Figure 12:
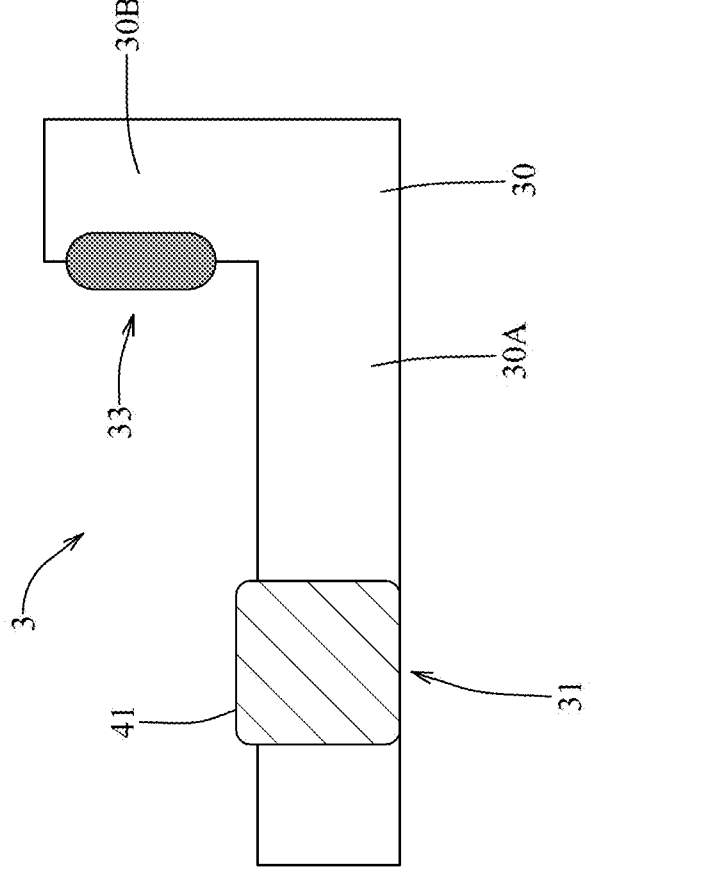
FIG. 12 is a side view of an add-on frame in accordance with some embodiments.
Figure 13:
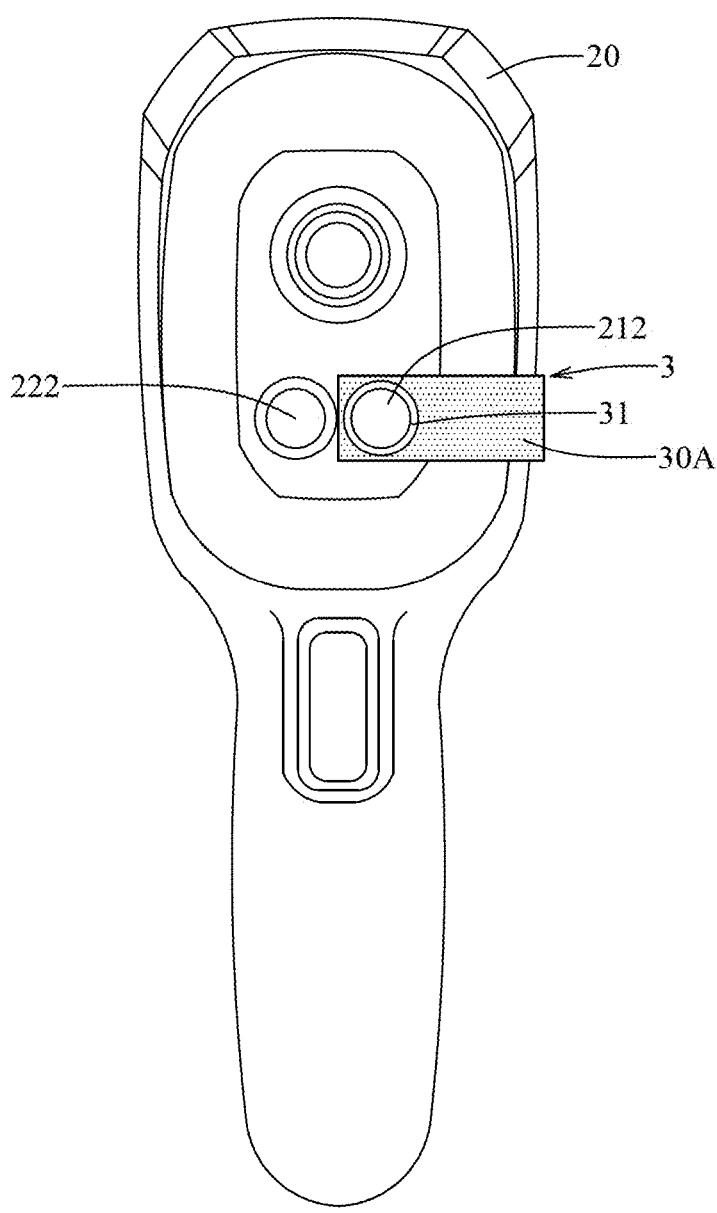
FIG. 13 is a schematic diagram illustrating the add-on frame attached to the thermal imaging camera in accordance with some embodiments.

FIG. 12 illustrates an example of the add-on frame 3, which has an L-shaped side view. The add-on frame 3 can be formed by injection-molded plastic or a thin metal sheet. The L-shaped add-on frame 3 includes a frame body 30 that is composed of a base plate 30A, and an arm plate 30B extending from the base plate 30A at an angle, and a connection mechanism 33 that is attached to the arm plate 30B. FIG. 13 illustrates an appearance of the add-on frame 3 attached to the aforesaid thermal imager model IRC130, where the visible light source 25 (see FIG. 11) is omitted. The base plate 30A is formed with a first opening 31 that is arranged to be aligned with the first lens 212 when the add-on frame 3 is attached to the housing 20. In one example, the connection mechanism 33 (see FIG. 12) is a magnet, and a metal piece (not shown) may be attached to a side surface of the housing 20, allowing the magnet to adhere through magnetic attraction, so the add-on frame 3 is secured to the housing 20. In one example, the connection mechanism 33 is a tenon, and the side surface of the housing 20 is equipped with a corresponding structure to interlock with the tenon, thereby securing the add-on frame 3 to the housing 20.

Figure 14:
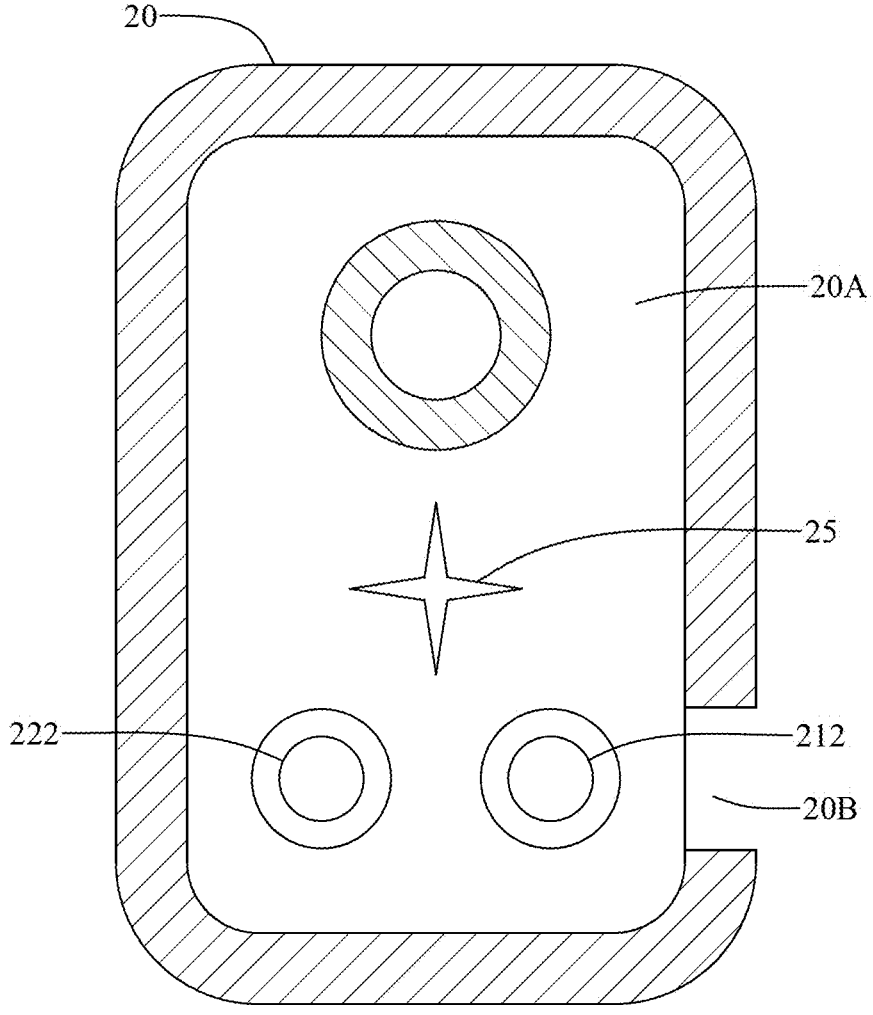
FIG. 14 is a schematic diagram illustrating a modified lens portion of the thermal imaging camera in accordance with some embodiments.
Figure 15:
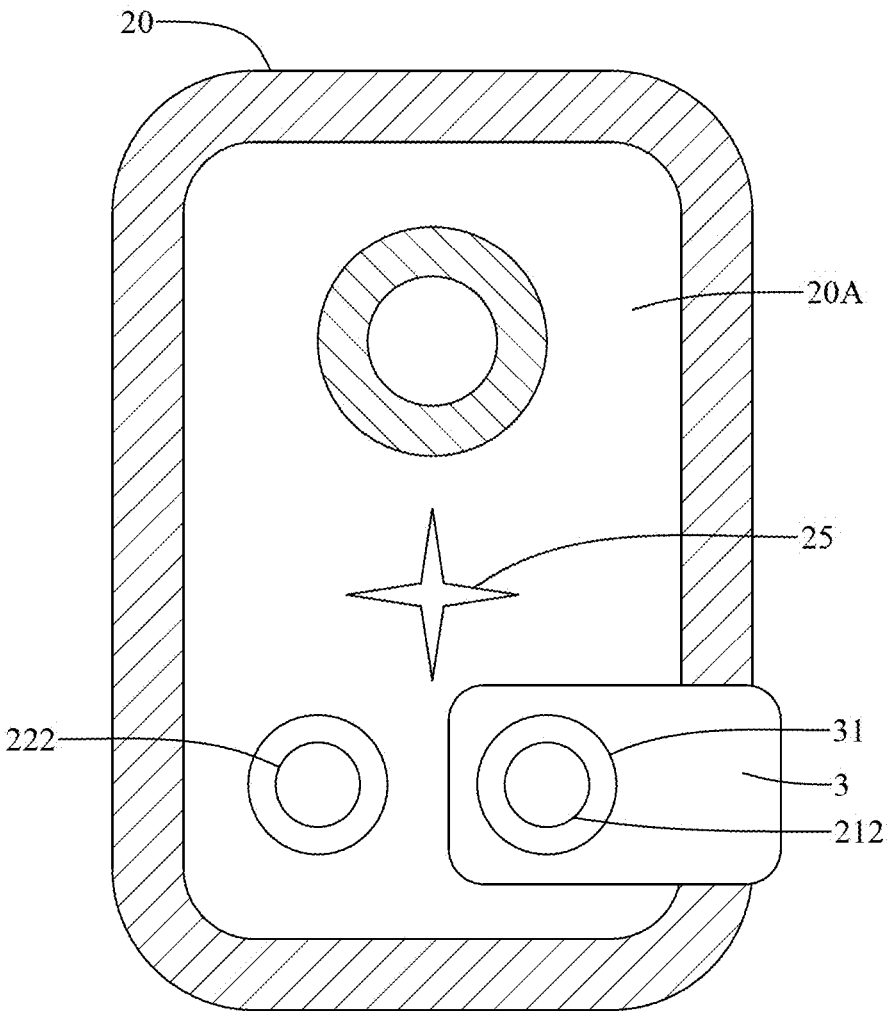
FIG. 15 is a schematic diagram illustrating an I-shaped add-on frame attached to the modified lens portion of the thermal imaging camera in accordance with some embodiments.

In one example, as shown in FIGS. 14 and 15, a front frame of the housing 20 is made of a rigid plastic material. On one side of the front frame, near the first lens 212, a space 20B is carved out to insert an I-shaped add-on frame 3, which fits into the space 20B. A metal plate (not shown) may be mounted to the housing 20 in the space 20B for a magnet that serves as the connection mechanism 33 to adhere.

Figure 16:
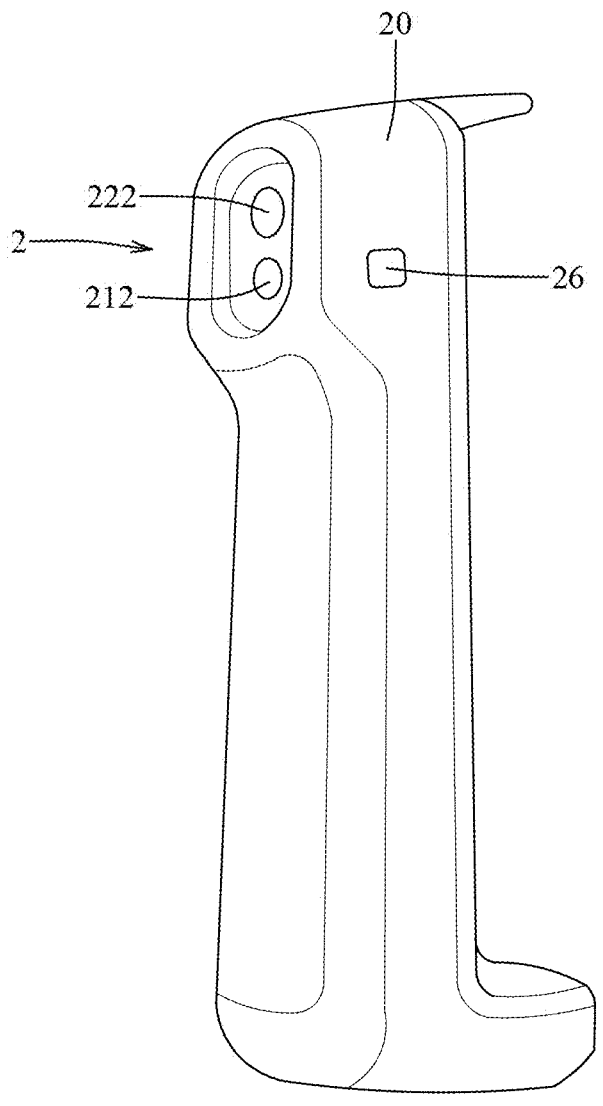
FIG. 16 is a perspective view illustrating a thermal imaging camera in accordance with some embodiments.
Figure 17:
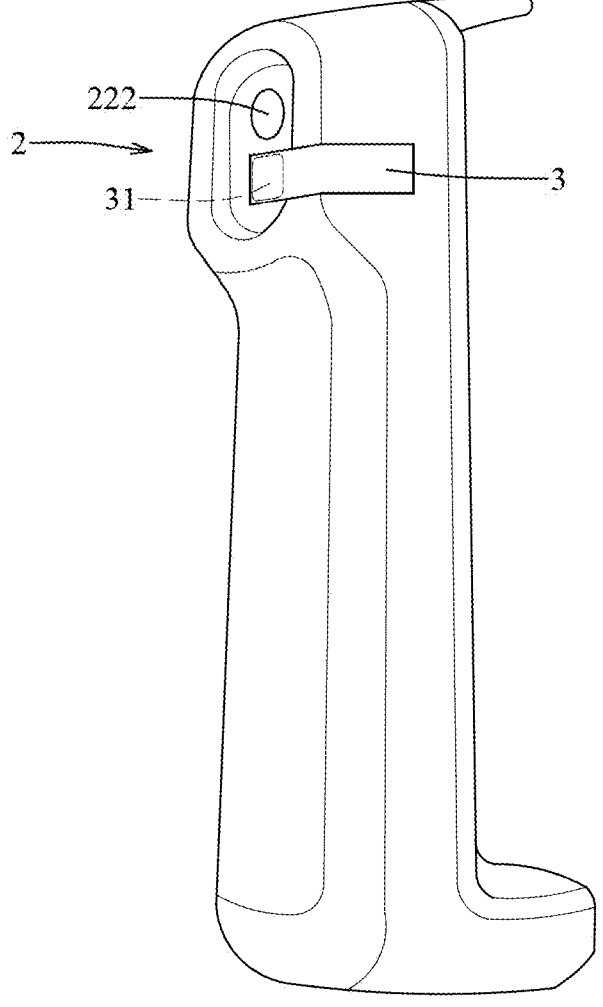
FIG. 17 is a perspective view illustrating an add-on frame attached to the thermal imaging camera in accordance with some embodiments.

FIG. 16 illustrates an appearance of an example of a thermal imaging camera 2, which is taken from a thermal camera model FLIR ONE® Edge Pro, developed by Teledyne FLIR LLC. A metal plate 26 is attached to a side surface of the housing 20 near the first lens 212. Further referring to FIG. 17, the add-on frame 3 is magnetically attached to the housing 20, with the first opening 31 corresponding in position to the first lens 212 (see FIG. 16).

Figure 18:
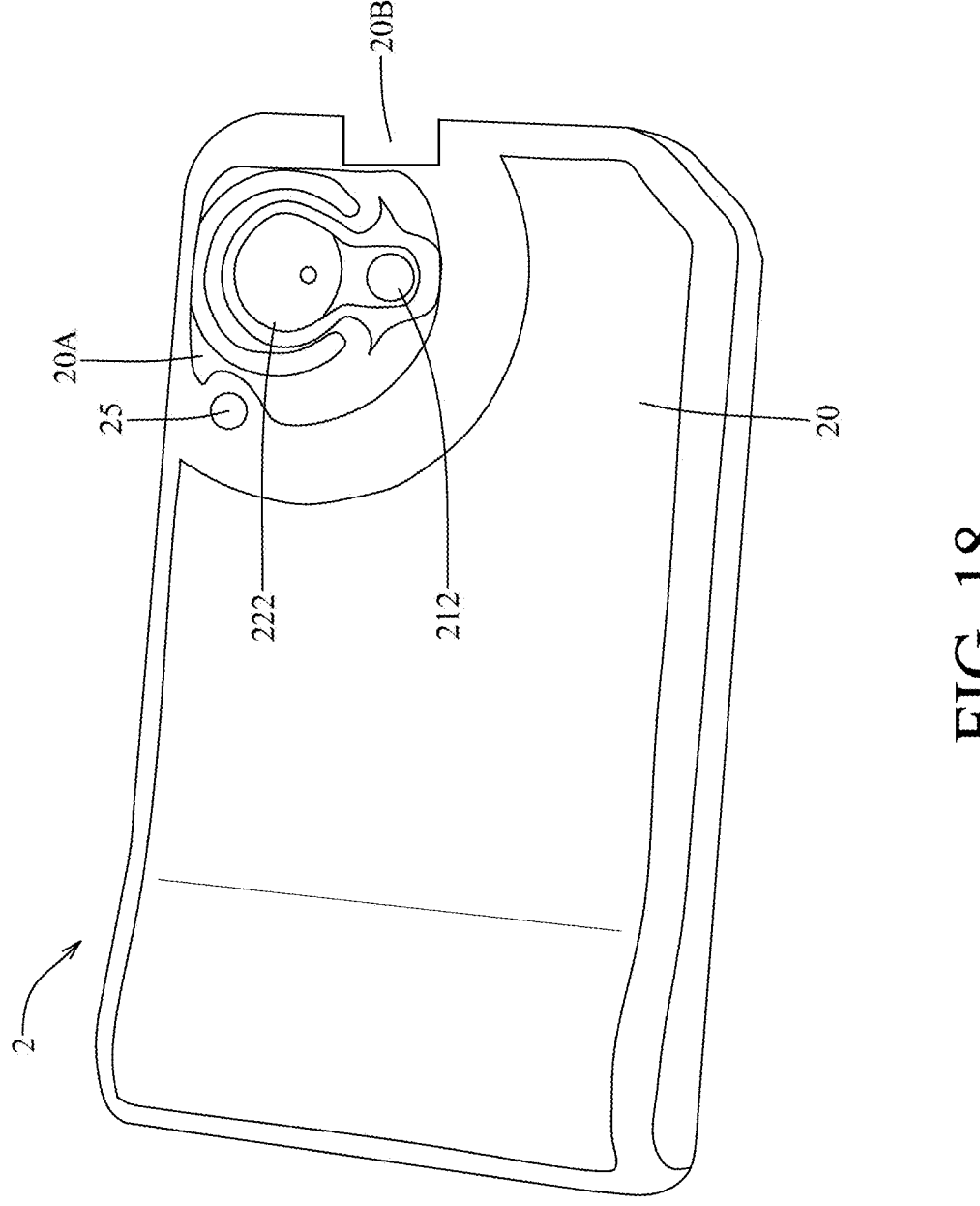
FIG. 18 is a fragmentary schematic diagram illustrating a thermal imaging camera in accordance with some embodiments.
Figure 19:
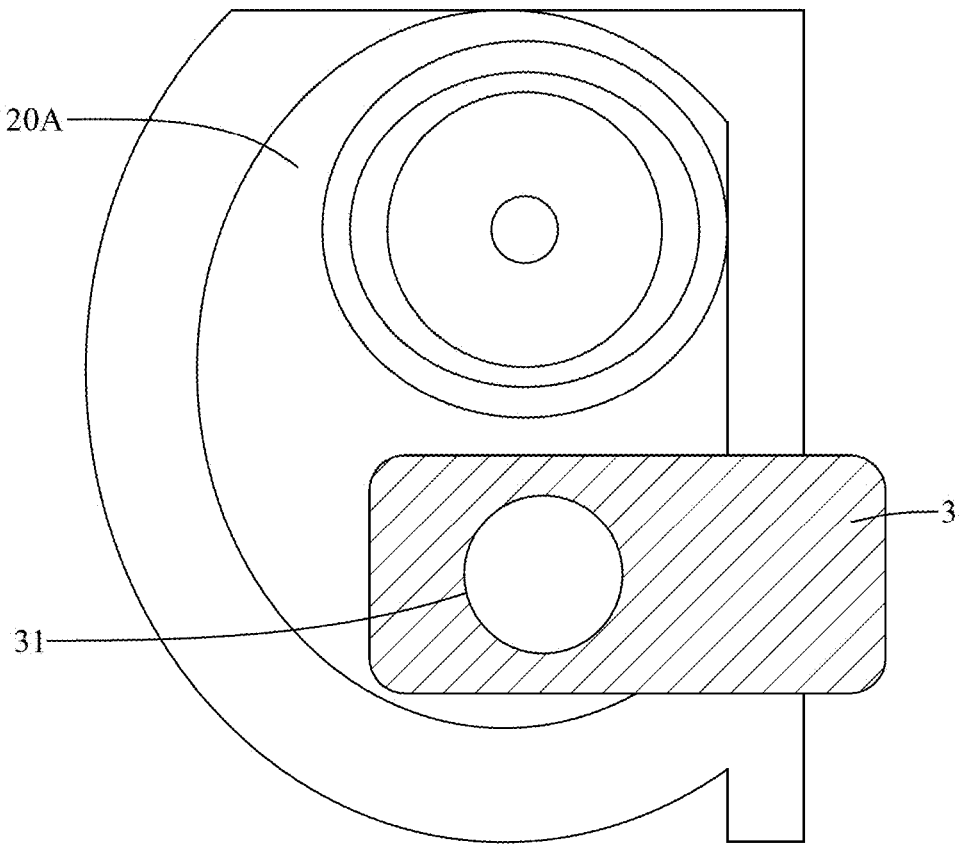
FIG. 19 is a fragmentary schematic diagram illustrating an add-on frame attached to a lens portion of the thermal imaging camera in accordance with some embodiments.

FIG. 18 illustrates an appearance of an example of a thermal imaging camera 2, which is taken from a thermal camera model ShotPro, developed by Seek Thermal™. The housing 20 is formed with a space 20B (e.g., a notch) at an edge of the lens portion 20A and near the first lens 212, and a connection component (e.g., a metal plate or a tenon, not shown) is provided in the space 20B for installation of the add-on frame 3, as shown in FIG. 19, where the first opening 31 is aligned with the first lens 212.

Referring back to FIG. 9, the second opening 32 of the add-on frame 3 corresponds in position to the second lens 222 (for capturing far-infrared), and is configured for mounting the optical element 42 therein. In some embodiments, the optical element 42 is a convex lens that has a coating containing germanium, and is used as a macro lens that is suitable for close-up photography and magnifying small objects. For example, when paired with the second camera module 22, the macro lens can be used to capture a pure thermal image of small heat sources in the environment. This can be useful for inspecting specific components on a printed circuit board to detect heat generated due to a malfunction. In some embodiments, the optical element 42 is made of an FIR-blocking material, thereby blocking the far-infrared from entering the second camera module 22. When the far-infrared is blocked, the pure thermal image generated by the second image sensor 221 does not include any information about the target scene, so the image generated by the processor 23 displays only the dual-spectral edges of the target scene, and no thermal image of the target scene would be presented in the image. Another approach for the thermal imaging camera 2 to generate an image that displays only the dual-spectral edges of the target scene and without the thermal image of the target scene is to connect a switch 24 between the second image sensor 221 and the processor 23. When the switch 24 is open, the thermal image generated by the second image sensor 221 and the corresponding digitizing circuit will not be transmitted to the processor 23, so the image generated by the processor 23 displays only the dual-spectral edges of the target scene.

Figure 20:
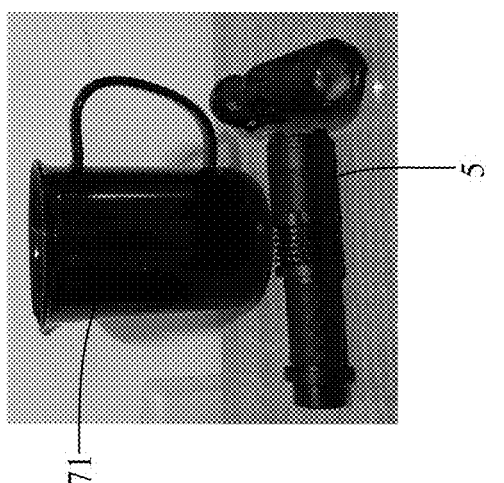

In the following descriptions, the functions of the thermal imaging system according to this disclosure would be demonstrated. FIG. 20 displays a black beaker 71 and an NIR light source 5. The black beaker 71 is made from a common transparent glass beaker 70 (see FIG. 21) that has undergone a dip-coating process with nanodye. The resulting black beaker 71 is opaque to visible light but transmissive to near-infrared. In this experiment, the NIR light source 5 is a light-emitting diode (LED) flashlight that emits narrowband near-infrared with a center wavelength of 940 nm and approximately 1 watt of power.

Figure 21:
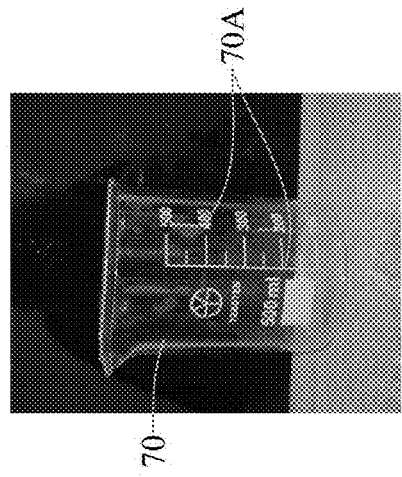

In FIG. 21, the body of the transparent glass beaker 70 is printed with opaque white markings 70A such as a capacity scale, a certification mark, and a total capacity label. After the transparent glass beaker 70 underwent the dip-coating with a nanoscale black dye, its outer surface appears as the black beaker 71, as shown in FIG. 20, and the opaque white markings 70A (see FIG. 21) are covered by the black dye and completely invisible to the human eyes.

Figure 22:
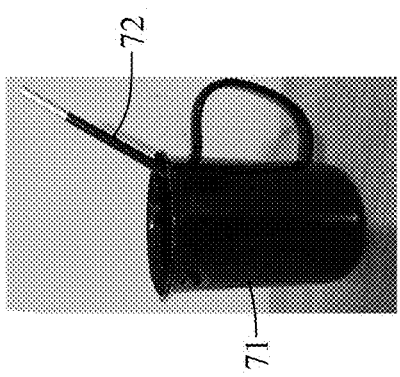
FIGS. 20 to 27 provide images for demonstrating functions of the thermal imaging system in accordance with some embodiments.

FIG. 22 displays the black beaker 71 that has been filled with hot water, with a black chopstick 72 placed inside.

Figure 23:
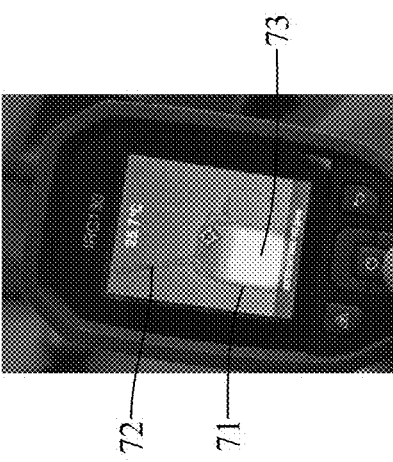

FIG. 23 shows an edge-enhanced thermal image that combines the pure thermal image of the hot water and the dual-spectral edges of the black beaker 71 and the chopstick 72, and that was captured using the thermal imaging system as shown in FIG. 9, with the NIR filter serving as the optical element 41 and without using the NIR light source 5 (see FIG. 20) to emit the narrowband near-infrared toward the black beaker 71. The edge-enhanced thermal image clearly displays a thermal image of the hot water 73, and dual-spectral edges of the beaker 71 and the chopstick 72. In fact, the so-called dual-spectral edges in FIG. 23 are mainly VIS edges, as evidenced by the fact that a part of the chopstick 72 inside the beaker 71 is not visible in the edge-enhanced image because the visible light is stronger than the near-infrared in the image-capturing environment, making the VIS image component overpower the NIR image component and thus dominate the dual-spectral image.

Figure 24:
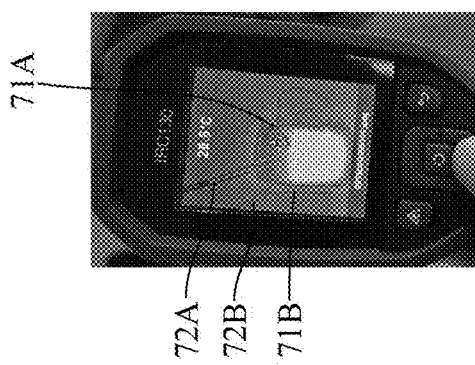

FIG. 24 shows an edge-enhanced thermal image that combines the pure thermal image of the hot water and the dual-spectral edges of the beaker 71 and the chopstick 72 (see FIG. 22), and that was captured using the thermal imaging system as shown in FIG. 9, with the NIR filter serving as the optical element 41 and the NIR light source 5 (see FIG. 20) being used to emit the narrowband near-infrared toward the black beaker 71 at a first angle relative to the black beaker 71. In FIG. 24, a water level inside the black beaker 71 is clearly seen through the thermal image, and the edges of both the portion of the chopstick 72 outside the beaker 71 and the portion inside the beaker 71 are visible in the edge-enhanced image. This is because the NIR light source 5 enhances the intensity of the near-infrared, making the NIR edges more prominent. Moreover, in FIG. 24, two sets of edges are displayed for each of the beaker 71 and the chopstick 72 (e.g., the set of edges 71A, 71B for the beaker 71, and the set of edges 72A, 72B for the chopstick 72), wherein the edges 71B, 72B result from the near-infrared emitted by the NIR light source 5. In other words, the near-infrared emitted by the NIR light source 5 created additional NIR edges 71B, 72B that are spaced apart from the edges 71A, 72A.

Figure 25:
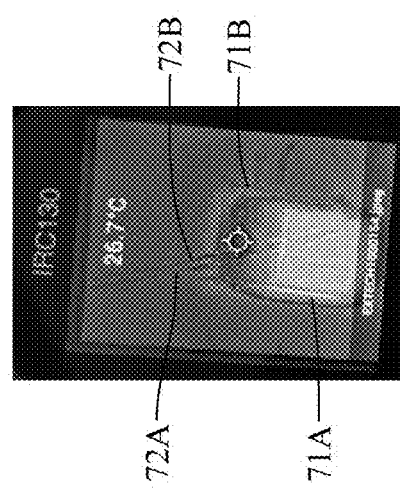

FIG. 25 shows an edge-enhanced thermal image that combines the pure thermal image of the hot water and the dual-spectral edges of the beaker 71 and the chopstick 72 (see FIG. 22), and that was captured using the thermal imaging system as shown in FIG. 9, with the NIR filter serving as the optical element 41 and the NIR light source 5 (see FIG. 20) being used to emit the narrowband near-infrared toward the black beaker 71 at a second angle relative to the black beaker 71, where the second angle is different from the first angle. Similar to FIG. 24, two non-overlapping sets of edges are displayed for each of the beaker 71 and the chopstick 72 in FIG. 25 (e.g., the sets of edges 71A, 71B for the beaker 71, and the sets of edges 72A, 72B for the chopstick 72). It is observed that the positions of the sets of edges 71B, 72B relative to the sets of edges 71A, 72A in FIG. 25 are different from the positions of the sets of edges 71B, 72B relative to the sets of edges 71A, 72A in FIG. 24, which means that the angle at which the NIR light source 5 illuminates the black beaker 71 determines the positions of the additional NIR edges in the edge-enhanced thermal image.

In some embodiments, the distance between the different sets of edges of the target scene in the image may be reduced or eliminated through software. For example, the software may be designed to provide up/down and/or left/right buttons that allow users to adjust the alignment of the pure thermal image, the VIS edges and the NIR edges to bring them as close as possible for overlapping each other.

Figure 26:
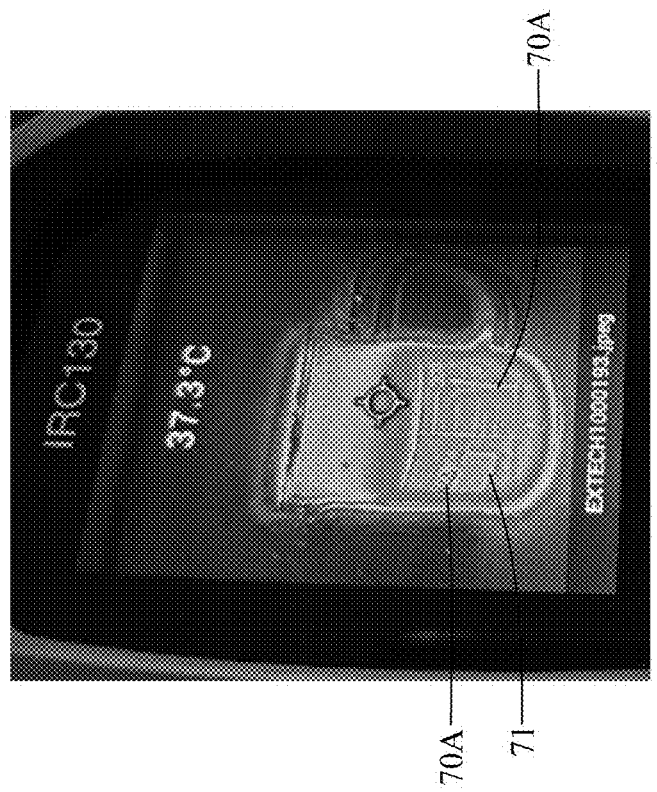

FIG. 26 shows an edge-enhanced thermal image that combines the pure thermal image of the hot water and the dual-spectral edges of the beaker 71, and that was captured using the thermal imaging system as shown in FIG. 9, with the NIR filter serving as the optical element 41 and the NIR light source 5 (see FIG. 20) being used to emit the narrowband near-infrared toward the black beaker 71 at a third angle relative to the black beaker 71. Under the illumination of near-infrared at the third angle, the markings 70A on the body of the beaker 71, which are invisible in a VIS image, can be clearly observed in the edge-enhanced thermal image because the near-infrared can pass through the black dye coated on the beaker 71, and the markings 70A are extracted to be a part of the NIR edges. By comparing FIGS. 24 to 26, it can be observed that the illumination angle of the NIR light source 5 may affect the detail and clarity of the resulting NIR edges. Since the NIR light source 5 of this disclosure is not fixed to the thermal imaging camera 2 and can be freely moved, the illumination angle of the NIR light source 5 can be flexibly adjusted to achieve the desired imaging effect and optimize the detail and clarity of the NIR edges in the edge-enhanced thermal image.

Figure 27:
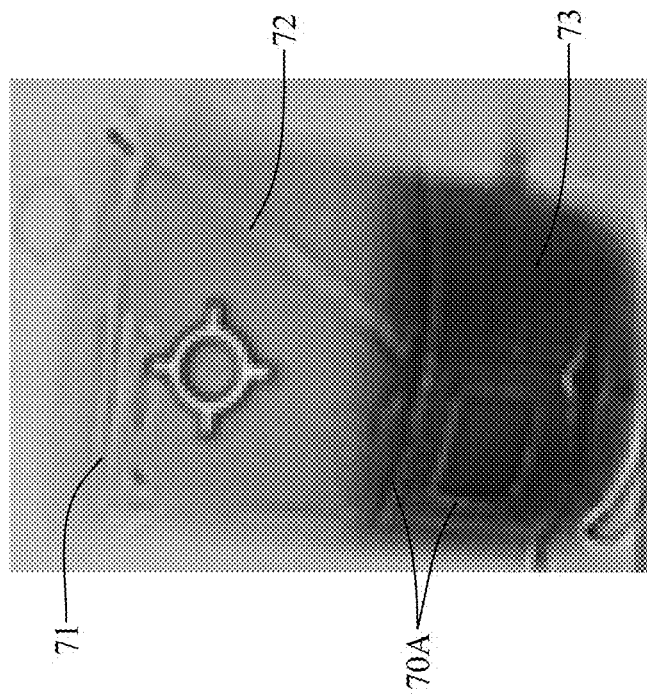

FIG. 27 shows an edge-enhanced thermal image that was captured using the thermal imaging system as shown in FIG. 9, with the NIR filter serving as the optical element 41 and the NIR light source 5 (see FIG. 20) being used to emit the narrowband near-infrared toward the black beaker 71. The edge-enhanced thermal image contains the thermal image of the hot water along with the dual-spectral edges of the markings 70A, the beaker 71, and the chopstick 72, presented in a "Gray" palette mode. In practice, different palette modes serve different interpretation purposes. For example, the "Gray" palette mode is particularly suited for resolving finer geometric details but is less effective at displaying small temperature differences. An "Iron" palette mode is highly intuitive and easy to understand, even for those with no experience in thermal imaging. A "Rainbow" palette mode is more vibrant and allows for transitions between light and dark colors. This creates greater contrast, but for objects with varied surfaces or multiple temperature levels, it may result in a noisier image.

According to the aforementioned experiments, it is evident that the thermal imaging system according to this disclosure, which uses the thermal imaging camera 2 that allows the near-infrared to enter the first image sensor 21, is able to obtain the edge-enhanced thermal image that includes not only the pure thermal image and the VIS edges but also the NIR edges, which would not be captured by the conventional thermal cameras (e.g., the aforesaid FLIR ONE® Edge Pro, IRC130, ShotPro, etc.) that include the infrared cutoff filter 14 disposed between the first image sensor 111 and the first lens 112 (see FIG. 1).

FIGS. 28 to 31 provide images captured using the thermal imaging system as shown in FIG. 9 in another experiment, where the black beaker 71 was filled with hot water and a stainless-steel spoon 81 is placed inside, where the NIR light source 5 was used to emit strong narrowband near-infrared toward the black beaker 71 and the spoon 81 at different angles, and where the edge extraction was not performed (e.g., the MSX® function was disabled). These images were generated without using the second camera module 22, and since the narrowband near-infrared is strong, the VIS image components in the images can be ignored. In other words, the images shown in FIGS. 28 to 31 can be deemed as pure NIR images (although they also include VIS image components that were too weak to be seen in the images). It is noted that although the beaker 71 is opaque and black to the human eyes (see FIG. 22), it appears to be transparent in FIGS. 28 to 31 because the black dye coated on the beaker 71 blocks visible light but allows near-infrared to pass therethrough.

Figure 28:
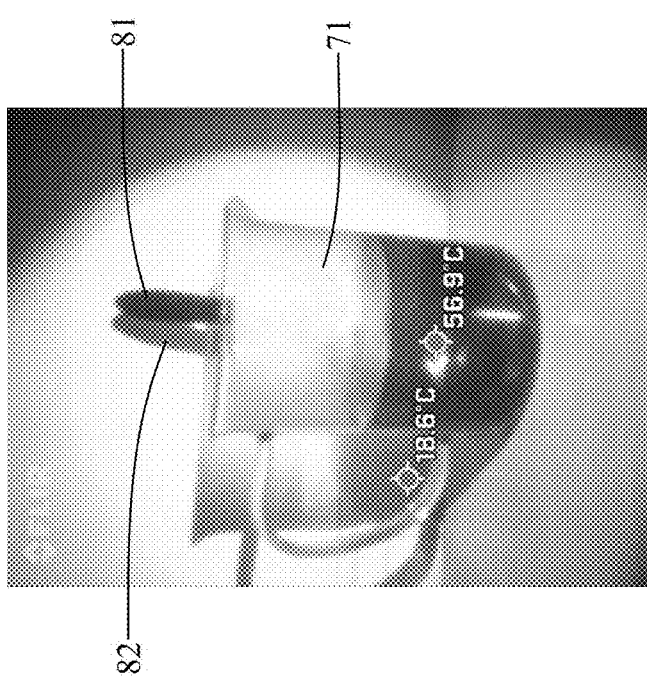

In FIG. 28, the black beaker 71 and the stainless-steel spoon 81 were illuminated along a first direction using the NIR light source 5 (see FIG. 9). A part of the stainless-steel spoon 81 inside the beaker 71 is nearly invisible. It is noted that a dark area 82 adjacent to the spoon 81 is an NIR shadow 82 of the spoon 81, which was formed when the spoon 81 is illuminated by the NIR light source 5 along the first direction.

Figure 29:
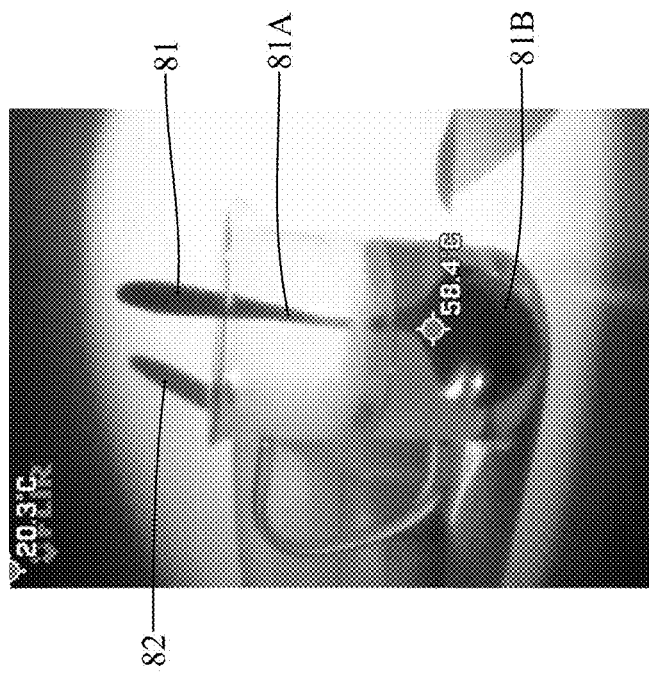
FIGS. 28 to 31 provide images captured using the thermal imaging system in accordance with some embodiments.

In FIG. 29, when the black beaker 71 and the spoon 81 were illuminated along a second direction using the NIR light source 5, an NIR image of a portion 81A of the spoon 81 inside the black beaker 71 becomes slightly visible. Additionally, an NIR image of a portion 81B of the spoon 81 submerged in the hot water can also be faintly observed.

Figure 30:
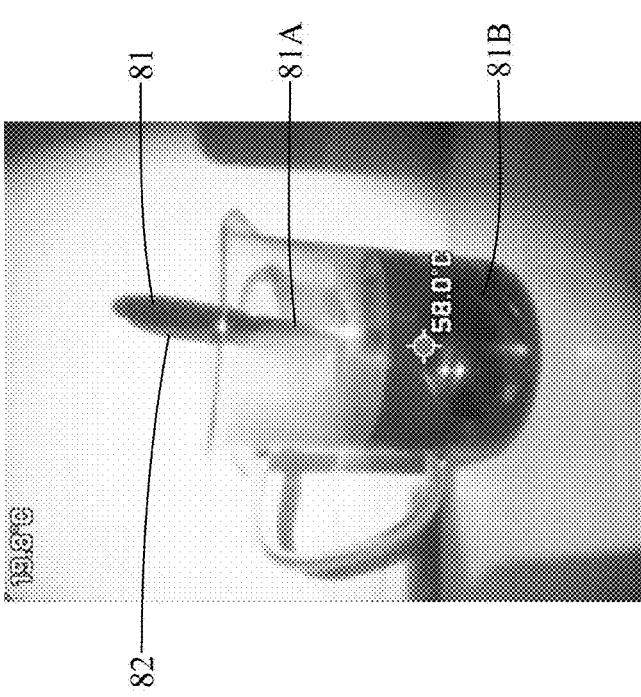

In FIG. 30, when the black beaker 71 and the spoon 81 were illuminated along a third direction using the NIR light source 5, an NIR image of the portion 81A of the spoon 81 inside the black beaker 71 becomes clearer, while an NIR image of the portion 81B of the spoon 81 submerged in the hot water appears less distinct.

Figure 31:
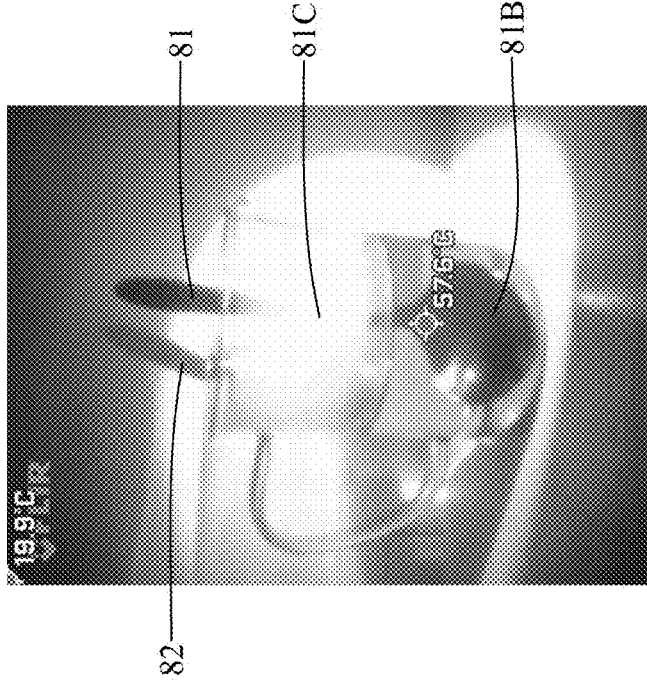

In FIG. 31, it is evident that at a location 81C where an NIR image of the portion 81A (see FIGS. 29 and 30) of the spoon 81 inside the black beaker 71 should appear, the image appears so bright that it is nearly indistinguishable. This phenomenon is caused by high intensity of the illumination of the NIR light source 5. The excessive brightness overwhelms the NIR image at the location 81C, making it difficult to discern. Therefore, it is necessary to reduce the brightness to restore visibility. This highlights the need for the dimmer 51 (see FIG. 9) of the NIR light source 5 to adjust the illumination intensity.

It is noted that the distances between the spoon 81 and its NIR shadow 82 among FIGS. 28 to 31 are different, proving that the near-infrared is emitted toward the beaker 71 and the spoon 81 in different directions. Therefore, it can be speculated from FIGS. 28 to 31 that either the intensity or the angle of the NIR illumination will affect the clarity of the resulting image.

Figure 33:
FIGS. 32 and 33 provide images for comparing the thermal imaging camera before and after removal of a built-in infrared cutoff filter in accordance with some embodiments.
Figure 32:
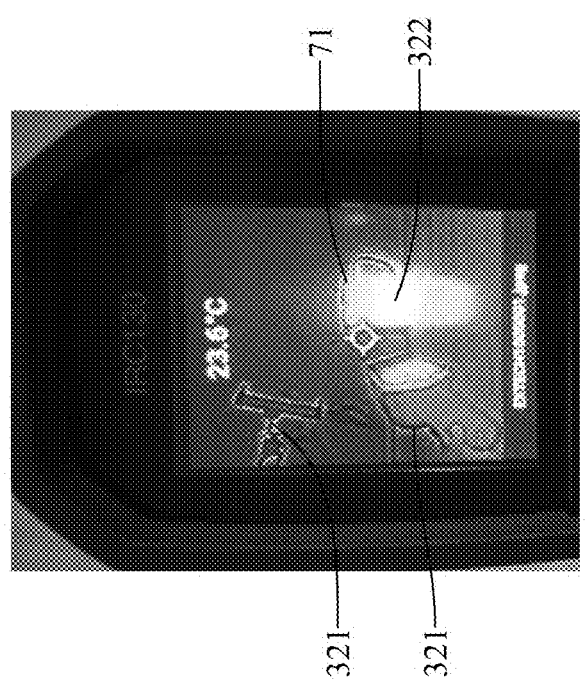

FIGS. 32 and 33 present a thermal imaging experiment comparing images captured by the thermal imaging camera IRC130P before and after the removal of the infrared cutoff filter 14 (see FIG. 1). FIG. 32 shows a blended thermal image that was captured before the removal of the infrared cutoff filter 14, and that was formed by overlaying the VIS edges 321 on the thermal image 322. FIG. 33 shows an edge-enhanced thermal image that was captured after the removal of the infrared cutoff filter 14 and under appropriate illumination of the narrowband near-infrared over the beaker 71, and that was formed by overlaying the dual-spectral edges 331 on the thermal image 332. It is seen that the contour of the beaker 71 in FIG. 33 is clearer than the contour of the beaker 71 in FIG. 32 because the illumination of the narrowband near-infrared on the beaker 71 enhanced the NIR edges of the beaker 71.

It can be speculated from FIGS. 32 and 33 that when the NIR light source 5 specifically illuminates a target object at a sufficiently large angle (e.g., as shown in FIG. 31), the target object will clearly appear in the NIR image, so the NIR edges would be enhanced in the resultant edge-enhanced thermal image. In other words, the NIR light source 5 enables the thermal imaging system to selectively overlay NIR edges on the thermal image. However, the appropriate illumination angle and intensity depend on factors such as the surface shape and internal structure of the target object, the environment, and interference from other wavelengths of electromagnetic waves, and thus may vary depending on actual conditions.

In practice, the imaging of a target object may sometimes be affected by an out-of-focus phenomenon, which may lead to challenges in accurate image interpretation, particularly in biological teaching experiments. For instance, in FIGS. 28 to 31, variations in the illumination angle of the NIR light source 5 may cause the near-infrared to become out of focus during imaging.

This results in the NIR edges failing to properly align with the thermal image of the target object. To address this issue, an effective approach is to adjust the position of the NIR light source 5 to different angles. Ideally, the point of incidence of the NIR image of the target object should either overlap or be as close as possible to a location of the target object captured by the first camera module 21 (see FIG. 9). Ensuring such alignment may enhance the accuracy of image interpretation. Another convenient approach is to use a built-in software application to manually align the NIR edges of the target object with the thermal image of the target object. For example, the software application may allow a user to manually adjust the NIR edges of the target object using up/down buttons and/or left/right buttons to bring the NIR edges closer to the thermal image of the target object.

In one embodiment, the NIR light source 5 (see FIG. 9) may be obtained by modifying a visible light source of a conventional thermal imaging camera (see the element 25 in FIG. 11), such as by replacing a white LED with an NIR LED, but this disclosure is not limited in this respect.

In one implementation, the thermal imaging system according to this disclosure (see FIG. 9) may be used to detect defective coffee beans in a batch of roasted coffee beans. In detail, a batch of single-origin roasted coffee beans is preheated to a temperature from 40° C. to 50° C., and then is subjected to imaging using the thermal imaging system of this disclosure under illumination of the narrowband near-infrared. This process enables rapid screening for internal defects by capturing and analyzing the edge-enhanced thermal images that combine thermal images and NIR edges, thereby distinguishing defective beans from non-defective ones.

In another experiment, a colored ceramic mug is used to demonstrate that near-infrared illumination promotes image contrast and improves detail, where the colored ceramic mug is opaque to both visible light and near-infrared.

Figure 34:
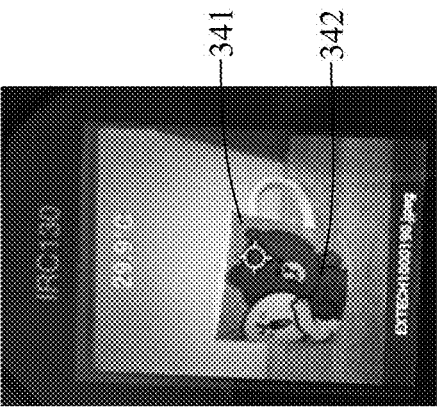

FIG. 34 shows a VIS image of a colored ceramic mug 341 filled with hot water and having a colored pattern 342 on its body. Since visible light cannot penetrate the body of the colored ceramic mug 341, it is unable to capture a VIS image of the hot water, making the hot water invisible in the image.

Figure 36:
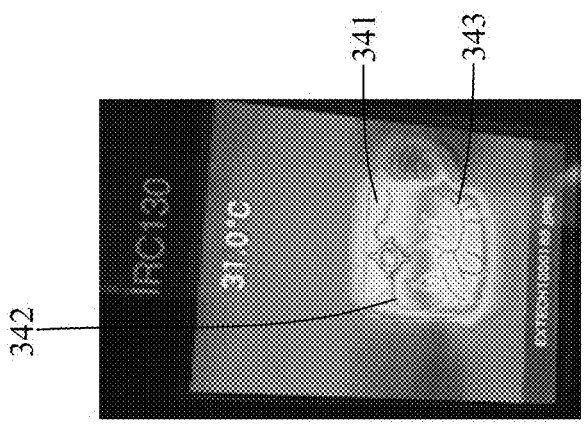
FIGS. 34 to 36 provide images for demonstrating the effect of near-infrared illumination.
Figure 35:
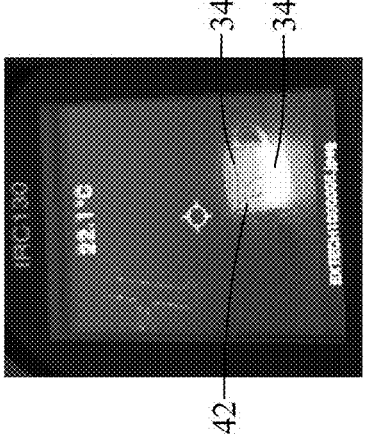

FIGS. 35 and 36 both show an edge-enhanced thermal image that combines the thermal image and the dual-spectral edges, where the image in FIG. 35 was captured by the thermal imaging system in FIG. 9 without using the NIR light source 5, and the image in FIG. 36 was captured by the thermal imaging system in FIG. 9 with the NIR light source 5 being used to project the narrowband near-infrared toward the mug 341. In both of FIGS. 35 and 36, the water level of the hot water 343 in the mug 341 can be observed through the thermal image, and the pattern 342 can be observed through the dual-spectral edges. However, the pattern 342 in FIG. 36 contains more details than the pattern 342 in FIG. 35, which demonstrates the effect of the NIR light source 5 in enhancing image detail, and this is because the near-infrared results in higher contrast. It is noted that, even in absence of visible light, the illumination of near-infrared can still make the resultant image to include the image detail, such as the contours of the mug 341 and the edges of the pattern 342.

In yet another experiment, several pieces of clothing on a hanger are used to demonstrate that near-infrared illumination promotes image contrast and improves detail.

Figure 39:
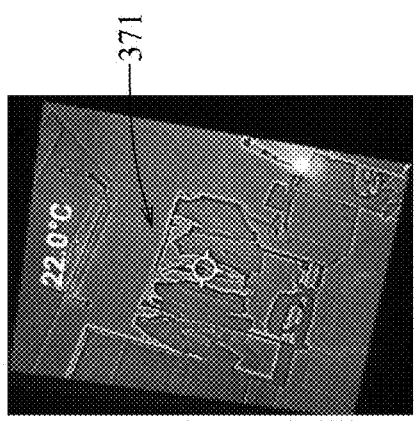
FIGS. 37 to 39 provide images for demonstrating the effect of near-infrared illumination.
Figure 38:
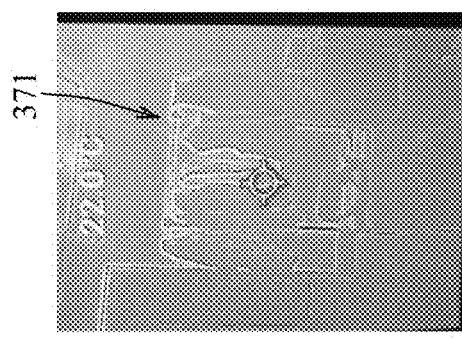
Figure 37:
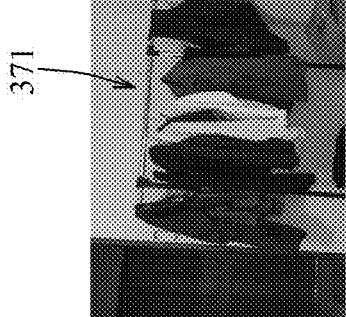

FIG. 37 shows a VIS image of the pieces of clothing 371 on the hanger. FIGS. 38 and 39 both show an edge-enhanced thermal image that combines the thermal image and the dual-spectral edges, where the image in FIG. 38 was captured by the thermal imaging system in FIG. 9 without using the NIR light source 5 and therefore the VIS edges dominate the edges in FIG. 38, and where the image in FIG. 39 was captured by the thermal imaging system in FIG. 9 with the NIR light source 5 being used to project the narrowband near-infrared toward the pieces of clothing 371 and the hanger and therefore the NIR edges dominate the edges in FIG. 39. It can be seen that the edges of the clothing in FIG. 39 are clearer than the edges of the clothing in FIG. 38.

Figure 40:
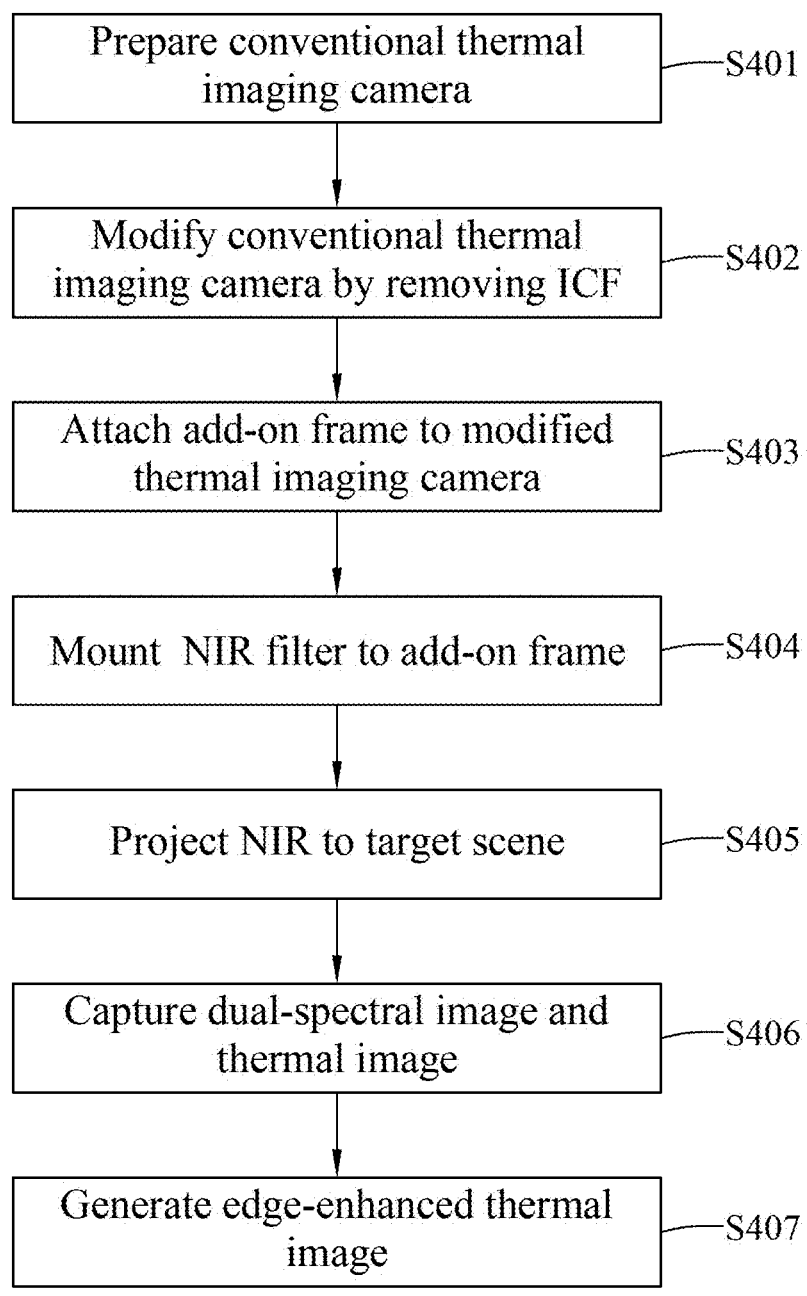
FIG. 40 is a flow chart illustrating steps of building the thermal imaging system and using the thermal imaging system to generate an edge-enhanced thermal image in accordance with some embodiments

FIG. 40 is a flow chart that summarizes previous descriptions and illustrates steps of building the thermal imaging system according to this disclosure and using the thermal imaging system to generate an edge-enhanced thermal image.

In step S401, a conventional thermal imaging camera (e.g., the IRC130, the FLIR ONE® Edge Pro, the ShotPro, etc., having the same configuration as the device 1 in FIG.

1) that is capable of generating a blended thermal image combining a thermal image and VIS edges (e.g., having the MSX® function) is prepared.

In step S402, the conventional thermal imaging camera 1 is dissembled, and the infrared cutoff filter (e.g., the element 14 in FIG. 1) inside the thermal imaging camera 1 is removed, so that the first image sensor 111 is able to receive not only visible light but also near-infrared. Then, the focal distance of the first lens 112 is readjusted to maintain image quality and prevent issues such as being out of focus. As a result, the conventional thermal imaging camera 1 is modified into the thermal imaging camera 2 as shown in FIGS. 7 and 9.

In step S403, an add-on frame (e.g., the element 3 in FIGS. 9, 12, 13, 15, 17 and 19) is attached to the thermal imaging camera 2.

In step S404, one or more optical elements (e.g., the elements 41, 42 in FIG. 9) are mounted to the add-on frame 3. Each of the optical elements 41, 42 may be, for example, an NIR filter, an infrared cut filter, a macro lens, etc., depending on the required function. In this embodiment, the optical element 41 is an NIR filter configured to filter out light with a wavelength falling outside of a spectrum of the visible light and a spectrum of narrowband near-infrared having a bandwidth of, for example, not greater than 40 nm, with a center wavelength of for example, 850 nm, 880 nm, 940 nm or 960 nm. As a result, the first image sensor 211 is able to receive visible light and narrowband near-infrared, and generate dual-spectral images that include a VIS image component and an NIR image component; and the processor 23 is able to perform edge extraction to extract dual-spectral edges from the dual-spectral images, and overlay the dual-spectral edges on a thermal image received from the second image sensor 221 to generate an edge-enhanced thermal image.

In step S405, an NIR light source (e.g., the element 5 in FIG. 9) is used to project the narrowband infrared toward the target scene (e.g., the black beaker 71 and the chopstick 72 in FIG. 22, the mug 341 in FIG. 34, and the pieces of clothing 371 in FIG. 37) from an appropriate position and with an appropriate intensity during the image capturing. This step is usually performed when the ambient visible light is insufficient (e.g., in a dark room).

In step S406, the thermal imaging camera 2 captures images of the target scene. Specifically, the first camera module 21 captures a dual-spectral image of the target scene, which includes a VIS image component and an NIR image component, and the second camera module 22 captures a thermal image (i.e., an FIR image) of the target scene. When the near-infrared is stronger than visible light in the environment (e.g., the NIR light source 5 is used to project narrowband near-infrared) during the image capturing, the NIR image component would dominate the dual-spectral image, and the dual-spectral image can be deemed as an NIR image.

In step S407, the processor 23 receives the dual-spectral image and the thermal image of the target scene, extracts dual-spectral edges from the dual-spectral image, and combines the thermal image with the dual-spectral edges that include VIS edge components and NIR edge components to generate an edge-enhanced thermal image.

Figure 41:
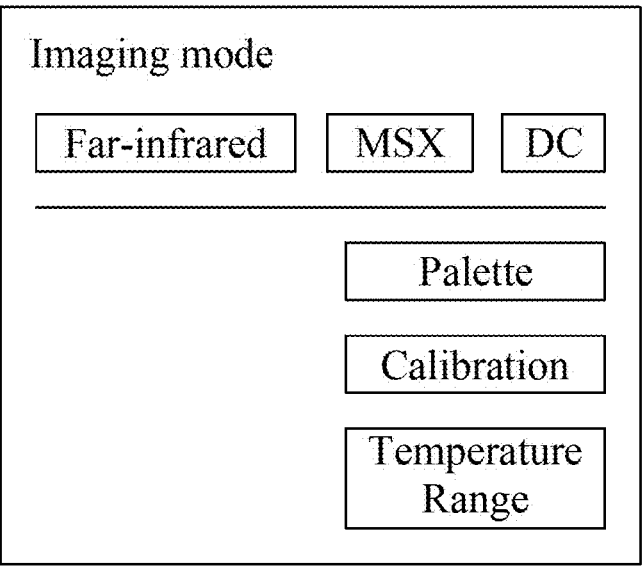
FIG. 41 is a schematic diagram illustrating an exemplary user interface of the thermal imaging camera in accordance with some embodiments.

FIG. 41 illustrates an exemplary user interface of the thermal imaging camera 1, 2 (see FIGS. 1, 7 and 9) for switching imaging mode and setting other functions. In the "Far-infrared" mode, the image outputted would be the pure thermal image captured by the second camera module 12, 22; in the "DC" mode, the image outputted would be the VIS image captured by the first camera module 11 for the thermal imaging camera 1 or the dual-spectral image captured by the first camera module 21 for the thermal imaging camera 2; and in the "MSX" mode, the image outputted would be the edge-enhanced thermal image that combines the thermal image and edges extracted from the VIS image or the dual-spectral image. The "Palette" function allows the user to select color presentation of the thermal image.

Figure 42:
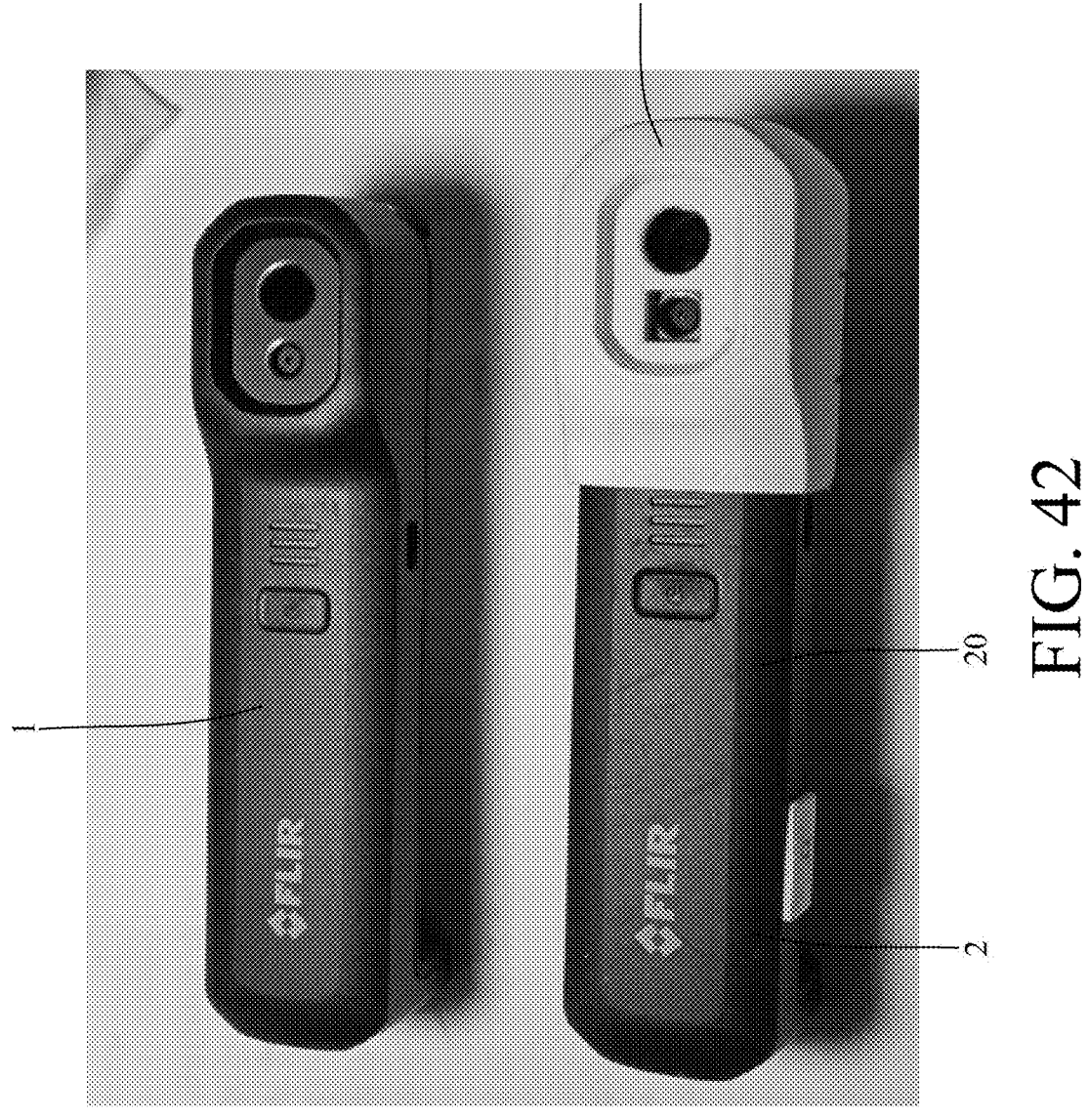
FIG. 42 is an image displaying appearances of thermal imaging cameras in accordance with some embodiments.

FIG. 42 displays a conventional thermal imaging camera 1, taken from the FLIR ONE® Edge Pro, and a modified thermal imaging camera 2, which is obtained by removing the infrared cutoff filter from the FLIR ONE® Edge Pro, with an add-on frame 3 being attached to the lens portion of the housing 20.

Figure 43:
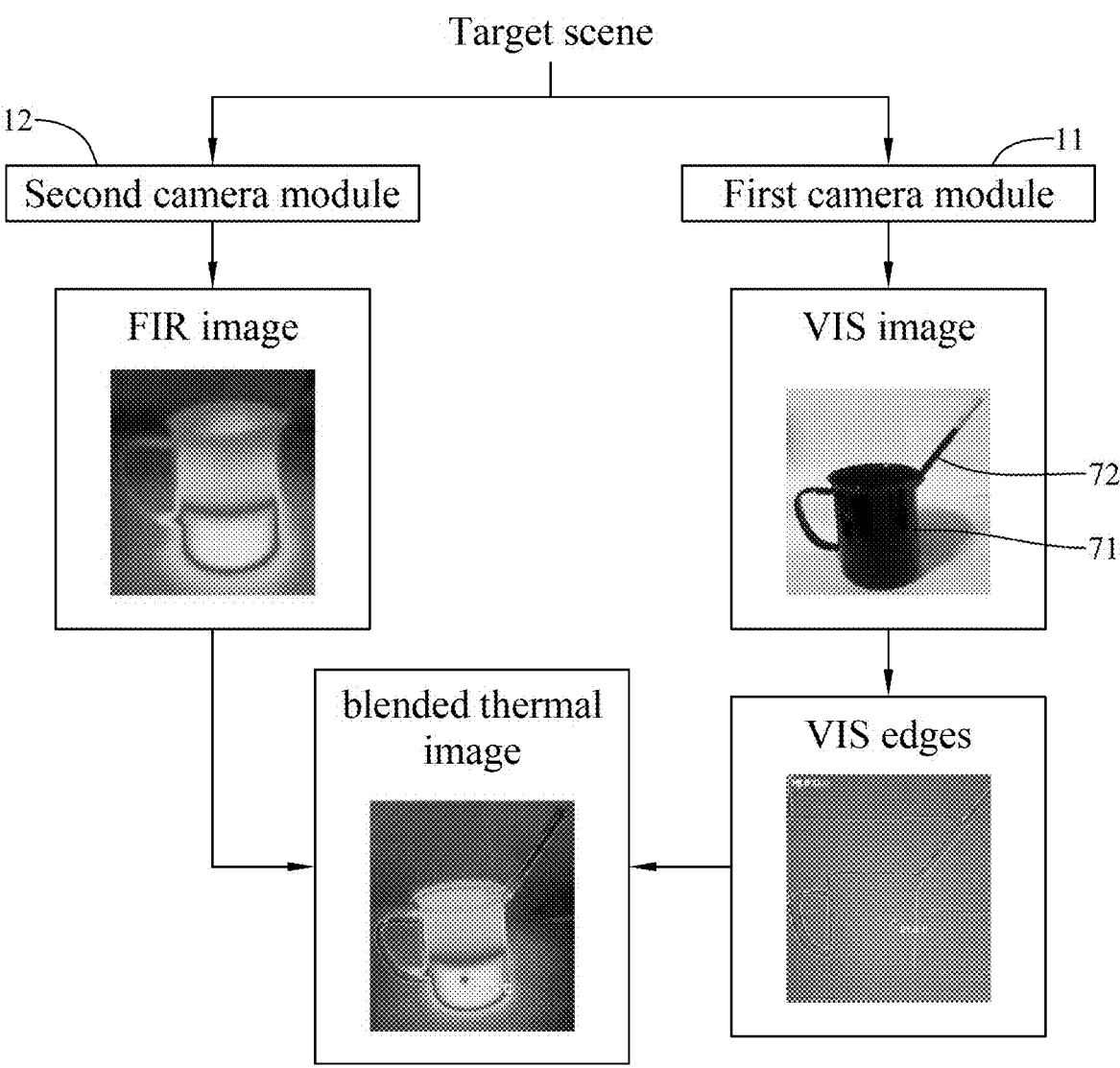
FIG. 43 illustrates operation of a conventional thermal imaging camera generating a blended thermal image.

FIG. 43 illustrates operation of the conventional thermal imaging camera 1 (see FIG. 1) to generate a blended thermal image that combines a pure thermal image and VIS edges. Similar to FIGS. 20 to 25, the target scene is exemplified as a black beaker 71 filled with hot water, and a partially black chopstick 72 placed in the black beaker 71. The FIR image (i.e., the thermal image) captured by the second camera module 12 shows a temperature gradient resulting from the hot water. The VIS image captured by the first camera module 11 shows the black beaker 71 and the partially black chopstick 72, where a portion of the chopstick 72 and the hot water that are inside the black beaker 71 are invisible in the VIS image. The VIS edges are extracted from the VIS image. The blended thermal image combines the VIS edges and the thermal image.

Figure 44:
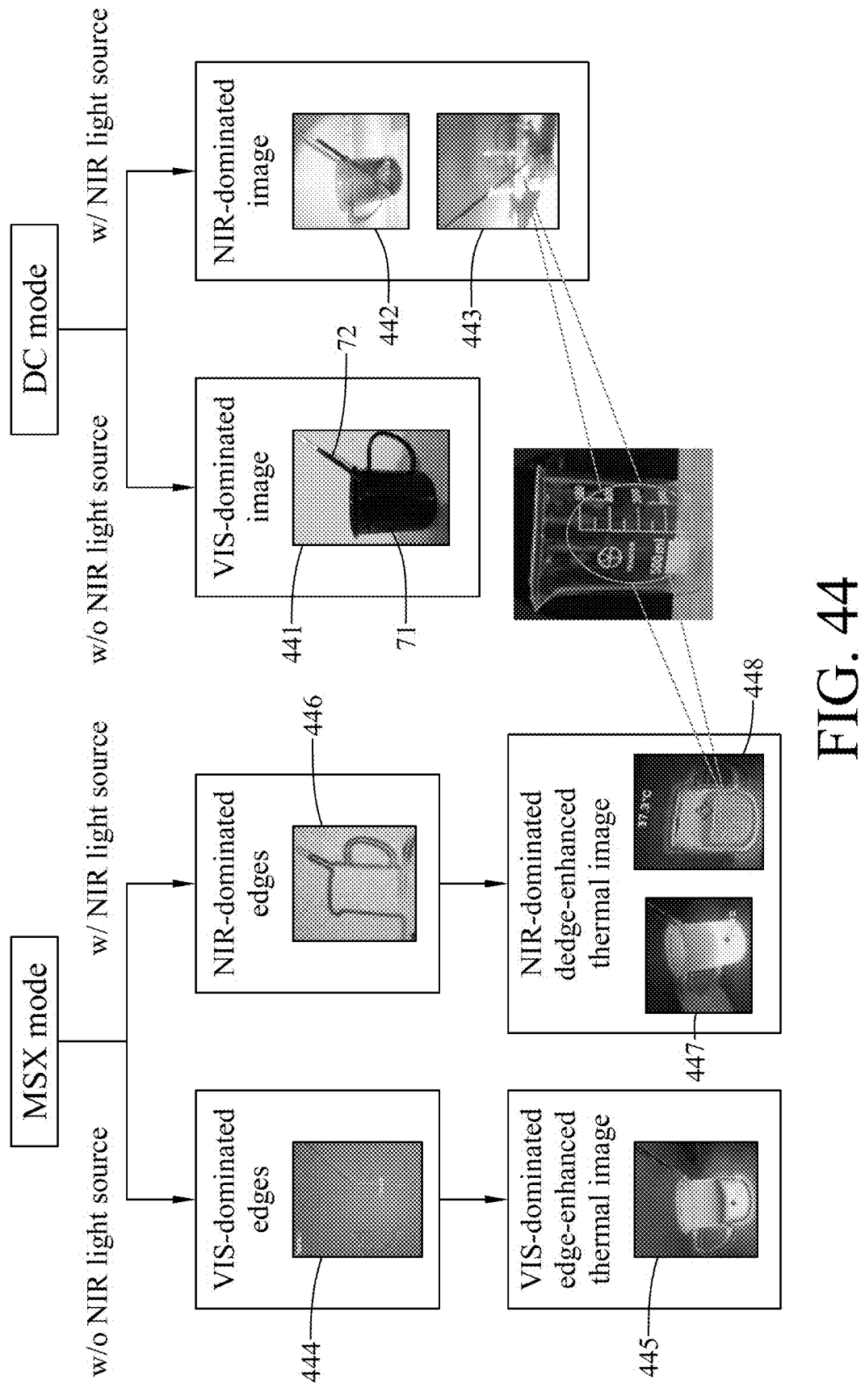
FIG. 44 illustrates operation of the modified thermal imaging camera under the MSX mode and the DC mode.

FIG. 44 illustrates operation of the thermal imaging camera 2 (see FIGS. 7 and 9) under the MSX mode and the DC mode, with the add-on frame 3 being attached to the thermal imaging camera 2, and the NIR filter being mounted to the add-on frame 3 in front of the first lens 212.

In the DC mode, when the NIR light source 5 is not used, the VIS image component dominates the dual-spectral image, so the dual-spectral image resembles the VIS image, as shown by the image 441. When the NIR light source 5 projects narrowband infrared to the target scene, the NIR image component dominates the dual-spectral image, so the dual-spectral image resembles the NIR image, as shown by the images 442, 443, where the black beaker 71 becomes transparent, and the markings 70A that have been covered by the black dye appear.

In the MSX mode, when the visible light is sufficient and the NIR light source 5 is not used, the dual-spectral edges extracted from the dual-spectral image are dominated by the VIS edge components, and therefore resemble the VIS edges, as shown by the image 444. Then, the VIS-dominated dual-spectral edges are overlaid on the pure thermal image to form the edge-enhanced thermal image, as shown by the image 445. When the visible light is insufficient and the NIR light source 5 projects narrowband near-infrared to the target scene, the dual-spectral edges extracted from the dual-spectral image are dominated by the NIR edge components, and therefore resemble the NIR edges, as shown by the image 446. Then, the NIR-dominated dual-spectral edges are overlaid on the pure thermal image to form the edge-enhanced thermal image, as shown by the images 447, 448, where the image 447 is presented in the "Gray" palette mode, and the image 448 is presented in the "Iron" palette mode for color presentation of the thermal image. It is noted that the markings 70A appear in the image 448 as well.

Figure 45:
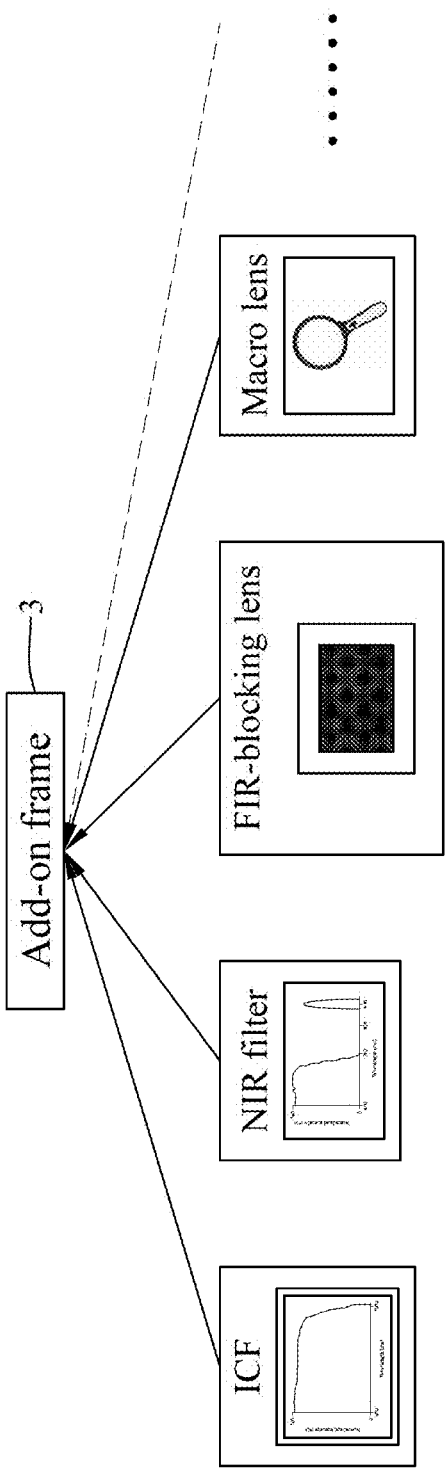
FIG. 45 is a block diagram illustrating that the add-on frame is adapted for mounting various types of optical elements in accordance with some embodiments.

FIG. 45 illustrates that the add-on frame 3 is adapted for mounting various types of optical elements, such as an infrared cutoff filter (ICF), an NIR filter, an FIR-blocking lens, a macro lens, and so on. The infrared cutoff filter allows passage of VIS wavelengths in the range of approximately from 400 nm to 700 nm. The NIR filter allows passage of the VIS wavelengths and narrowband near-infrared wavelengths with a center wavelength of, for example, 850 nm, 880 nm, 940 nm or 960 nm. The FIR-blocking lens is dedicated for the second lens 222 (see FIGS. 7 and 9). The macro lens is capable of magnification and close-up photography.

Figure 46:
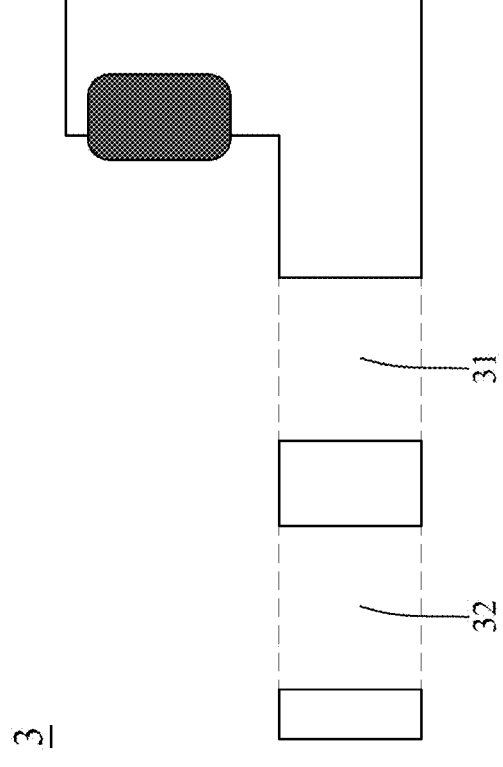
FIG. 46 is a schematic diagram illustrating an add-on frame in accordance with some embodiments.

FIG. 46 illustrates an implement of the add-on frame 3, which has an L-shaped side view, and which includes two openings 31, 32 respectively corresponding to the first lens 212 and the second lens 222.

Figure 47:
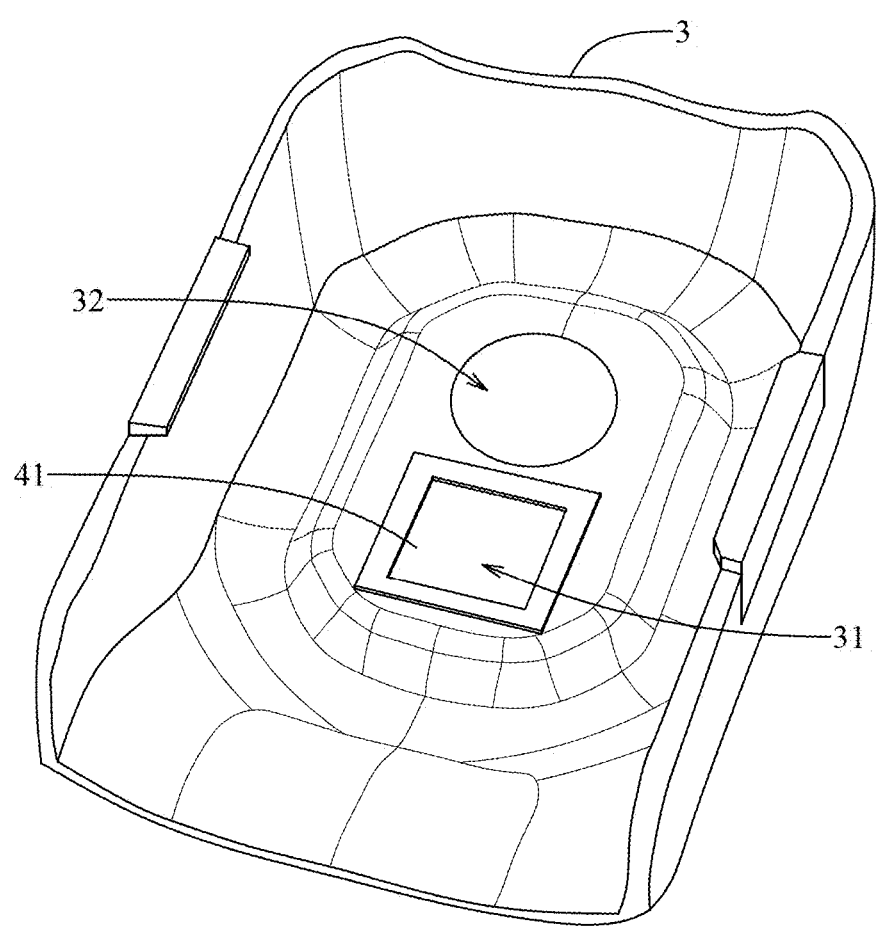
FIG. 47 is a perspective view illustrating an add-on frame in accordance with some embodiments.
Figure 48:
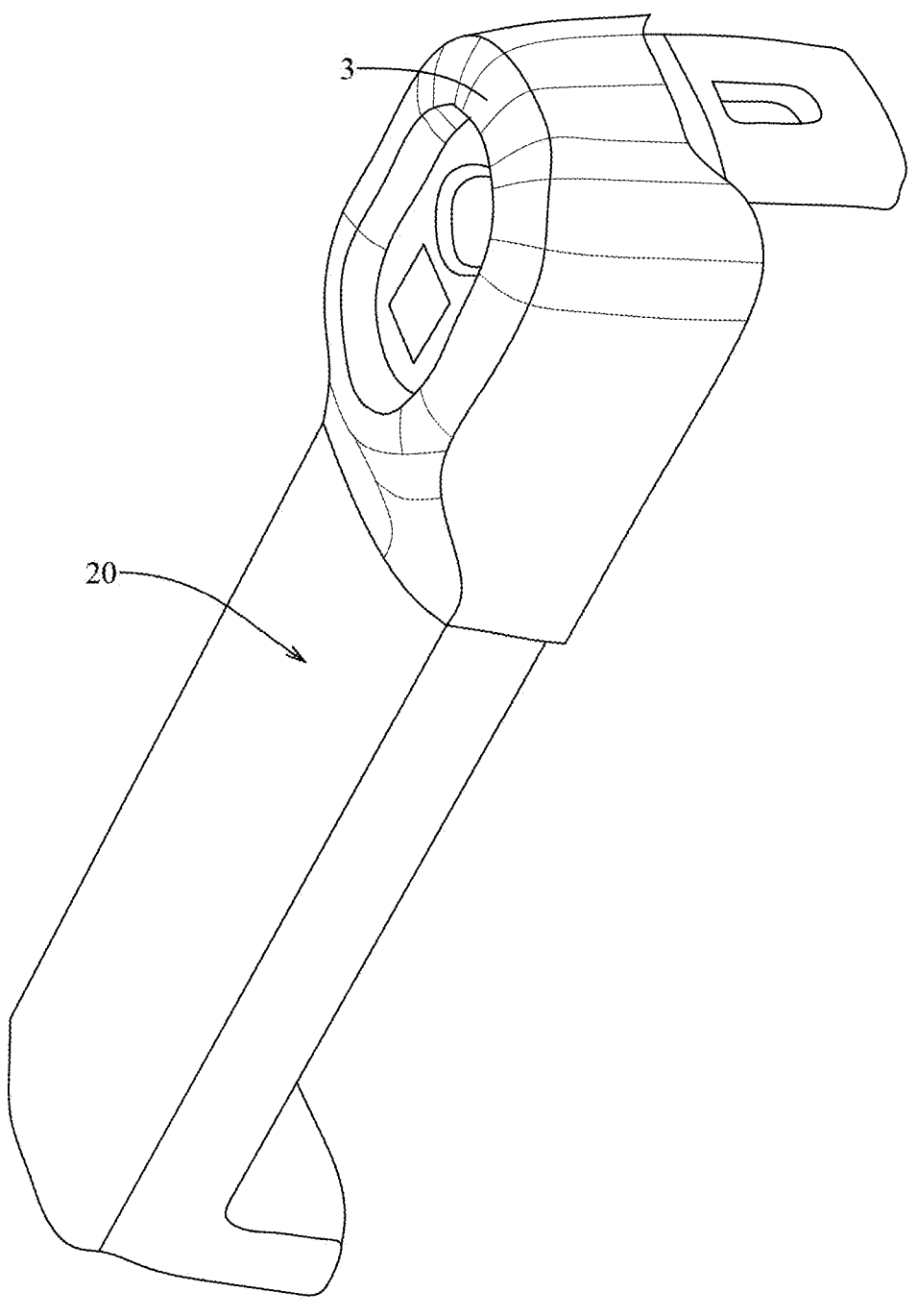
FIG. 48 is a perspective view illustrating the add-on frame attached to the thermal imaging camera in accordance with some embodiments.

FIGS. 47 and 48 illustrate another implement of the add-on frame 3, which is made as a full-coverage mask fitting the lens portion of the housing 20. The add-on frame 3 has a square first opening 31 corresponding in position to the first lens 212 (see FIG. 9) and a circular second opening 32 corresponding in position to the second lens 222 (see FIG. 9), and the first optical element 41 is mounted in the first opening 31.

Figure 49:
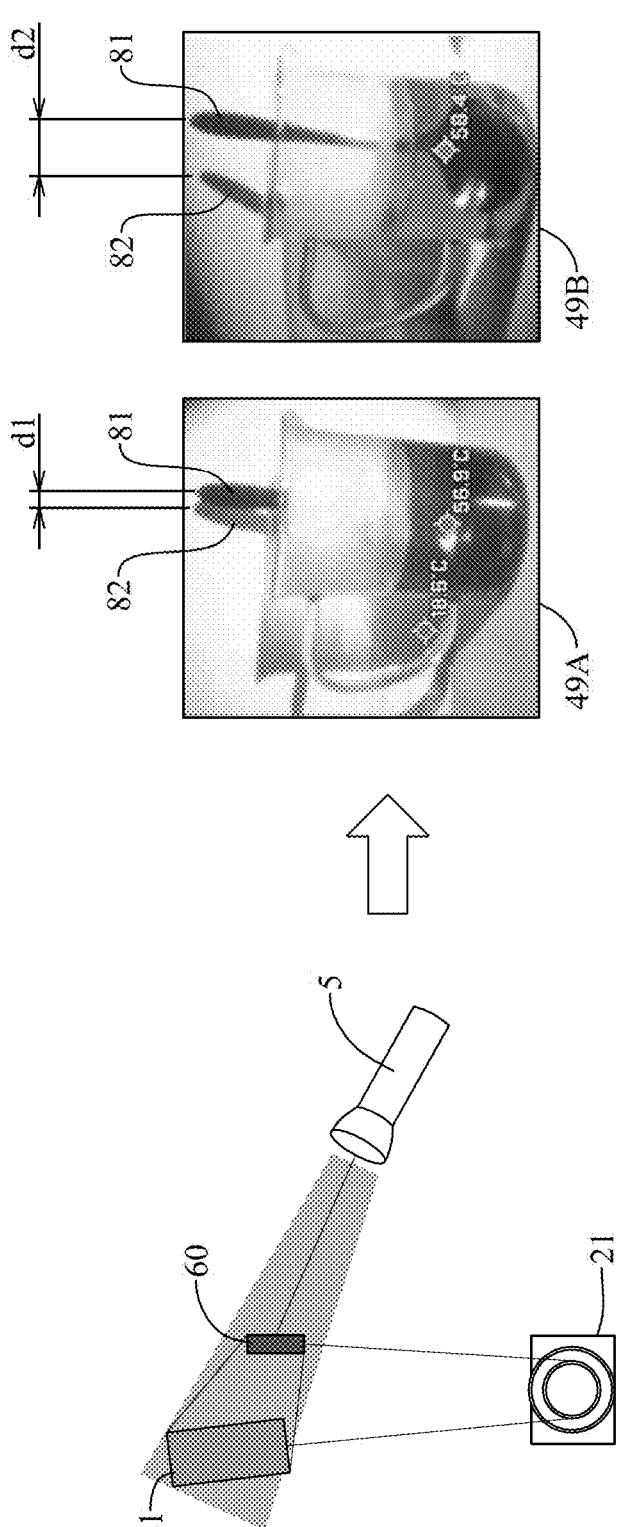
FIG. 49 illustrates an example of using a single-point NIR light source to project near-infrared toward a target object in accordance with some embodiments.

FIG. 49 illustrates that the NIR light source 5 projects the narrowband near-infrared to a target object 60, and forms an NIR shadow 61 of the target object 60, where the NIR light source 5 is a single-point light source. When the NIR light source 5 illuminates the target object 60 at different angles, the distances between the target object 60 and the NIR shadow 61 would be different. For example, at the right portion of FIG. 49, a distance d1 between the spoon 81 and the NIR spoon shadow 82 in the NIR image 49A is different from a distance d2 between the spoon 81 and the NIR spoon shadow 82 in the NIR image 49B.

Figure 50:
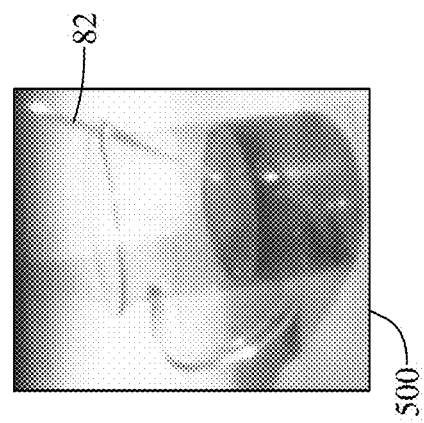
FIG. 50 illustrates an example of using an array-type NIR light source to project near-infrared toward a target object in accordance with some embodiments.
Figure 50:
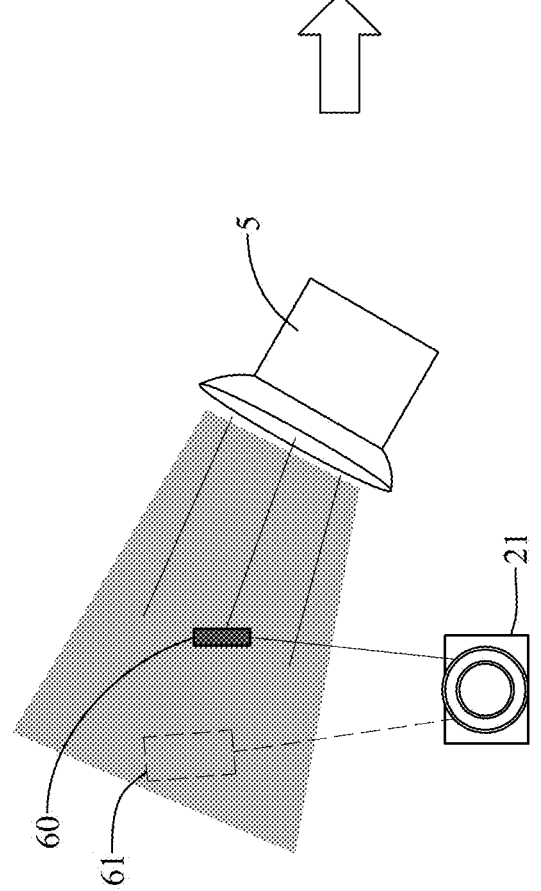
Figure 51:
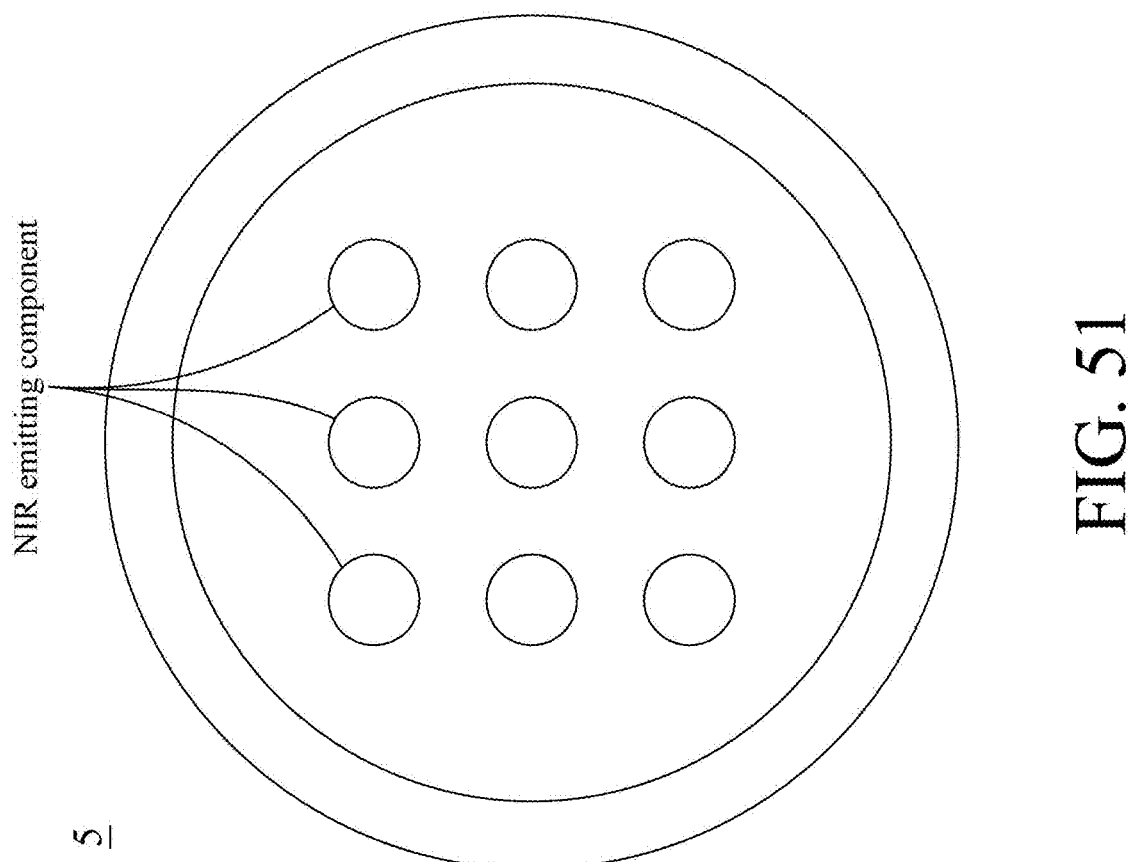
FIG. 51 is a schematic diagram illustrating a plurality of NIR emitting components of the array-type NIR light source in accordance with some embodiments.

FIG. 50 illustrates that the NIR light source 5 projects the narrowband near-infrared to a target object 60, and forms an NIR shadow 61 of the target object 60, where the NIR light source 5 is an array-type light source that includes, for example, a plurality of NIR emitting components (e.g., NIR LEDs) arranged in an array, as illustrated in FIG. 51. In this case, the NIR shadow 61 would be eliminated due to full illumination by multiple simultaneously projected point NIR light sources at different angles, as shown in the NIR image 500. In some embodiments, multiple single-point NIR light sources may be used as an array-type NIR light source that projects the near-infrared to the target object 60 simultaneously at different angles, thereby eliminating the NIR shadow.

In accordance with some embodiments, the thermal imaging camera according to this disclosure is capable of overlaying dual-spectral edges onto pure thermal images. This technical feature is related to modifications made to a conventional thermal imaging camera to enhance its capability of capturing multispectral images. This is a unique feature not found in any non-military thermal imaging cameras currently available.

In accordance with some embodiments, by adhering or embedding optical elements with different functions into the openings of the add-on frame, the first camera module of the thermal imaging camera according to this disclosure is able to capture visible light edges and/or narrowband near-infrared edges. In some embodiments, by mounting a macro lens in the second opening of the add-on frame, the second camera module of the thermal imaging camera may capture pure thermal images with a macro magnification function.

In accordance with some embodiments, the processor of the thermal imaging camera extracts dual-spectral edges from the VIS images and/or NIR images obtained through the add-on frame, and overlays the dual-spectral edges on the pure thermal image, thereby generating an edge-enhanced thermal image.

In accordance with some embodiments, an FIR-blocking lens may be mounted in the second opening of the add-on frame to obstruct the second camera module from capturing the pure thermal image, so the resultant image outputted by the processor would include only the dual-spectral edges, and none of the conventional thermal imaging cameras is able to achieve this function. A switch may be connected between the second image sensor and the processor to achieve the same effect.

In accordance with some embodiments, the add-on frame can be paired with various types of optical elements to provide the thermal imaging camera with advanced capabilities that it originally lacks, such as enhancing image details, magnification, and close-up imaging.

In accordance with some embodiments, the thermal imaging camera utilizes the array-type NIR light source at a narrowband near-infrared wavelength of 850 nm, 880 nm, 940 nm or 960 nm, which is spaced apart from the visible light spectrum. This helps the visible light camera capture near-infrared images without unwanted red interference, particularly at narrowband near-infrared wavelength of 940 nm and above. Additionally, by adjusting the appropriate angle and direction of illumination using the array-type NIR light source, the thermal imaging camera can further capture the required near-infrared images accurately.

In conventional thermal imaging cameras, the NIR light source is fixed to the device, making it impossible to adjust the illumination angle as needed to enhance image details. In contrast, the thermal imaging system according to this disclosure utilizes an NIR light source that operates independently of the thermal imaging camera, allowing for flexible adjustment of both the illumination angle and intensity, thereby effectively capturing better image details.

In summary, traditional thermal imaging cameras generate blended thermal images that combine visible light images and pure thermal images or combine visible light edges and pure thermal image. The embodiments of this disclosure improve image details by combining NIR edges with a pure thermal image, and this is also suitable for environments with insufficient visible light.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A thermal imaging system adapted to generate an edge-enhanced image, comprising:

a first camera module configured to receive both of visible light (VIS) and near-infrared (NIR) from a target scene, and to generate a dual-spectral image that is composed of a VIS image component and an NIR image component based on the visible light and the near-infrared;

a second camera module configured to receive far-infrared from the target scene, and to generate a far-infrared (FIR) image based on the far-infrared;

an array-type NIR light source including a plurality of NIR emitting components disposed to emit near-infrared toward the target scene simultaneously at different angles; and a processor electrically connected to said first camera module and said second camera module, and configured to generate the edge-enhanced image using one of a first image processing and a second image processing, wherein, in the first image processing, said processor overlays the dual-spectral image on the FIR image using alpha blending, wherein, in the second image processing, said processor extracts dual-spectral edges of the target scene from the VIS image component and the NIR image component of the dual-spectral image, and overlays the dual-spectral edges on the FIR image, where the dual-spectral edges contain VIS edge components extracted from the VIS image component, and NIR edge components extracted from the NIR image component, wherein said first camera module includes a first lens allowing passage of the visible light and the near-infrared, and said second camera module includes a second lens allowing passage of the far-infrared, and wherein said thermal imaging system further comprises:

a housing accommodating said first camera module, said second camera module, and said processor, and having a lens portion from which said first lens and said second lens are exposed;

an add-on frame detachably mounted to said lens portion of said housing, and having a first opening that is aligned with said first lens, and that is disposed between said first lens and the target scene; and an optical element mounted in said first opening, and being one of an NIR filter lens, an infrared cut filter, and a macro lens, wherein said NIR filter lens is configured to filter out light with a wavelength falling outside of a spectrum of the visible light and a spectrum of narrowband near-infrared that has a bandwidth of not greater than 40 nm, with a center wavelength of 850 nm. 880 nm, 940 nm or 960 nm.

2. The thermal imaging system as claimed in claim 1, wherein said add-on frame further has a second opening that is aligned with said second lens and disposed between said second lens and the target scene.

3. The thermal imaging system as claimed in claim 2, further comprising an FIR-blocking element mounted in said second opening, thereby blocking the far-infrared from entering said second camera module.

4. The thermal imaging system as claimed in claim 1, wherein said macro lens is a convex lens that has a coating containing germanium and that is configured to have magnifying effect.

5. The thermal imaging system as claimed in claim 1, wherein said add-on frame includes one of a magnet configured to magnetically attach to said housing and a tenon configured to interlock with said housing.

6. The thermal imaging system as claimed in claim 1, wherein said NIR light source includes a dimmer operable to adjust an intensity of the near-infrared.

7. The thermal imaging system as claimed in claim 1, wherein said NIR light source is disposed to emit narrowband near-infrared toward the target scene when said first camera module is capturing an image of the target scene.

8. The thermal imaging system as claimed in claim 7, wherein the narrowband near-infrared emitted by said NIR light source has a center wavelength of 850 nm, 880 nm, 940 nm or 960 nm.

* * * * *